United States Patent [19]

Rivshin

[11] Patent Number: 5,276,799
[45] Date of Patent: Jan. 4, 1994

[54] EXPANDABLE ELECTRONIC SUBSYSTEM FOR A PRINTING MACHINE

[75] Inventor: Isaak Rivshin, Pittsford, N.Y.
[73] Assignee: Xerox Corporation, Stamford, Conn.
[21] Appl. No.: 784,195
[22] Filed: Oct. 29, 1991
[51] Int. Cl.$^5$ .............................................. G06F 15/20
[52] U.S. Cl. ...................................... 395/162; 395/114; 358/296
[58] Field of Search ................... 358/76, 442, 468, 296, 358/300; 370/67; 395/162-164; 364/DIG.

[56] References Cited

U.S. PATENT DOCUMENTS

| | | | |
|---|---|---|---|
| 4,169,275 | 9/1979 | Gunning | 358/300 |
| 4,205,350 | 5/1980 | Gunning | 358/296 |
| 4,580,171 | 4/1986 | Arimoto | 358/280 |
| 4,672,186 | 6/1987 | Van Tyne | 235/470 |
| 4,760,458 | 7/1988 | Watanabe et al. | 358/76 |
| 4,800,431 | 1/1989 | Deering | 358/160 |
| 4,920,427 | 4/1990 | Hirata | 358/437 |
| 4,931,984 | 6/1990 | Ny | 364/900 |
| 4,947,345 | 8/1990 | Paradise et al. | 358/442 |
| 4,987,529 | 1/1991 | Craft et al. | 364/200 |
| 5,016,114 | 5/1991 | Sakata et al. | 358/404 |
| 5,021,892 | 6/1991 | Kita et al. | 358/468 |
| 5,027,221 | 1/1991 | Hisatake et al. | 358/300 |
| 5,038,218 | 8/1991 | Matsumoto | 358/296 |
| 5,130,809 | 7/1992 | Takayanagi | 358/300 |
| 5,170,266 | 12/1992 | Marsh et al. | 358/468 |
| 5,177,737 | 1/1993 | Daudelin et al. | 370/67 |

OTHER PUBLICATIONS

Research Disclosure Mar. 1991, 32388 Reproduction Apparatus Providing User Manual and Other Documentation pp. 201-203.

Primary Examiner—Dale M. Shaw
Assistant Examiner—Kee M. Tung
Attorney, Agent, or Firm—Gary B. Cohen

[57] ABSTRACT

An improved printing machine, of the type in which image data, addresses and control data can be substantially concurrently transferred across multiple multipurpose buses, is provided. The printing machine comprises a first multipurpose bus adapted to substantially concurrently transfer a first set of the image data, addresses and control data and a second multipurpose bus adapted to substantially concurrently transfer a second set of the image data, addresses and control data. A module for processing the first and second sets of data communicates with the first and second multipurpose buses while a first discrete input/output module communicates with the first bus. Both the first processing module and the first discrete input/output module are adapted to transfer the first set of data between one another. A second discrete input/output module communicates with the second multipurpose bus and a third discrete input/output module communicates with the second multipurpose bus. both the second and third discrete input/output modules are adapted to transfer the second set of data between one another. Preferably, the first set of data can be transferred between the processing module and the first discrete input/output module substantially concurrent with the second set of data being transferred between the second discrete input/output module and the third discrete input/output module.

19 Claims, 15 Drawing Sheets

EXPANDABLE ELECTRONIC SUBSYSTEM FOR A PRINTING MACHINE

BACKGROUND OF THE INVENTION

The subject matter of the present case is related to now allowed copending U.S. patent application Ser. No. 07/784,493, filed Oct. 29, 1991, entitled "VIDEO PROCESSOR FOR A PRINTING APPARATUS," the pertinent portions of which are incorporated herein by reference, and to copending U.S. patent application Ser. No. 07/784481, filed Oct. 29, 1991, entitled "VIDEO PROCESSOR FOR A PRINTING APPARATUS," the pertinent portions of which are incorporated herein by reference.

Field of the Invention

The present invention relates generally to a printing apparatus, and more particularly to an improved expandable modular-based electronic subsystem capable of performing a plurality of operations substantially concurrently.

Description of the Prior Art

It is now well accepted that electronic reprographic systems, such as Canon's NP-9030 digital copying apparatus, have certain distinct advantages over known light-lens systems. The NP-9030 was one of the first electronic reprographic systems to be marketed with the capability to convert an optical image from a scanned original to image intensity signals, and reconstruct the signals, by way of a print engine using a pulsed diode laser. Because of the many image processing capabilities of the electronic reprographic system, which allows for, among other things, cut and paste operations, these types of systems are gaining immensely in popularity. While the NP-9030 was, when first introduced, a revolutionary product, it can no longer keep pace with advancements in the art, many of which are spurred on by advancements in related art areas, such as facsimile and computer.

Advancements in the area of digital design has had a profound effect on the design of electronic reprographic systems. Indeed, in 1990, Xerox launched an electronic reprographic system, known as Docutech, that should serve as a benchmark in the area of electronic reprographics for many years to come. In systems such as Docutech, documents being scanned by an automatic document scanner, also known as an image input terminal (IIT), are processed by an electronic sub-system (ESS) controller and stored in permanent memory pending printing, editing or later use. The ESS of the Docutech system represents a great advancement in the art, however, the highly advanced ESS of Docutech carries a relatively high price, in terms of design and manufacturing. Consequently, to those users who seek some of the advantages of electronic reprographics, without the potentially inaccessible price tag of Docutech, there continues to be a demand for a system having a relatively high speed, yet inexpensive ESS.

A relatively inexpensive electronic reprographic machine is disclosed in RESEARCH DISCLOSURE, No. 32388, March, 1991. This machine comprises a scanner communicating with a memory section and a Video Processor (VP) by way of a CPU. In one form of operation image data can be transmitted to addresses configured in the memory by the CPU. Moreover, the image data can be retrieved from memory and processed with the VP.

The following patents, which relate to image data transfer in image processing devices, may be of pertinence to the present disclosure:

U.S. Pat. No. 4,580,171
Patentee: Arimoto
Issued: Apr. 1, 1986
U.S. Pat. No. 4,800,431
Patentee: Deering
Issued: Jan. 24, 1989
U.S. Pat. No. 4,920,427
Patentee: Hirata
Issued: Apr. 24, 1990
U.S. Pat. No. 4,931,984
Patentee: Ny
Issued: Jun. 5, 1990
U.S. Pat. No. 4,987,529
Patentee: Craft et al.
Issued: Jan. 22, 1991
U.S. Pat. No. 5,016,114
Patentee: Sakata et al.
Issued: May 14, 1991
U.S. Pat. No. 5,021,892
Patentee: Kita et al.
Issued: Jun. 4, 1991
U.S. Pat. No. 5,027,221
Patentee: Hisatake et al.
Issued: Jun. 25, 1991
U.S. Pat. No. 5,038,218
Patentee: Matsumoto
Issued: Aug. 6, 1991

U.S. Pat. No. 4-580-171 discloses an image a system in which a reader is coupled with a CPU and an image memory. The memory includes an address counter for sequentially designating addresses to which respective bytes of image data generated by the reader are transferred. As each address is designated by the counter, a memory control signal is transmitted from the CPU to the memory so that the byte can be transferred to or from the memory. An arrangement of a byte counter and a comparator is employed to determine when a preselected number of bytes has been transferred to or from the memory. The preselected number of bytes written into the memory are transferred to a pair of line buffers for subsequent output.

U.S. Pat. No. 4,800,431 discloses a video signal processing device frame buffer controller for storing a frame of an image in its original, intermediate or final form in a frame memory. The frame buffer controller comprises a video input interface, a video output interface, a microprocessor interface and a memory interface. Input data is in an eight bit format, and two successive eight bit chunks are stored in an input buffer so that a sixteen bit format can be transferred to memory through a memory controller. Similarly, in the output interface sixteen bits from the memory are held in a buffer and transmitted to the output eight at a time. This allows the input and output channels to alternate internally while appearing externally to be operating simultaneously. Apparently, data from a system controller, namely a microprocessor, is transferred to the memory controller by way of the input buffer. Hence, it follows that the system controller cannot access the memory controller while image data is being inputted to the input buffer.

U.S. Pat. No. 4,920-427 discloses a facsimile apparatus having multiple bus lines. A first pair of bus lines for carrying image data are coupled with a DMA, a RAM, a disk controller, a data compressor, a data decompressor and a CPU. The CPU is also connected to a third bus, the third bus being connected to a plurality of devices including a working memory (a RAM) for the CPU and a ROM for storing programs used in the CPU. An object of the invention is achieved by inhibiting at least a calling operation during an interval in which a call signal is interrupted so as to prevent "collision" of a receiving operation and the calling operation.

U.S. Pat. No. 4,931,984 discloses a file data retrieving system architecture including: a main bus having a CPU, a memory and a plurality of interfaces connected thereto; an image bus; a pair of data processing units for performing data compression and reproduction, each data processing unit being connected to both the main bus and the image bus; and two display memories, each display memory having data storage capacity corresponding to at least one page of a document of a maximum size, and each display memory being connected to both the main bus and the image bus. The above-described architecture makes it possible to reduce load on the main bus due to a toggle processing of data wherein image data is only transmitted on the image data bus.

U.S. Pat. No. 4,987,529 discloses a bus arbitration control system for a computer system having a microprocessor, a system memory, a memory refresh circuit, a DMA controller, and a plurality of peripheral device bus masters and a shared bus. The arbitration control system gives highest priority to a bus access request signal from the memory refresh circuit. The DMA controller is given second priority access to a shared bus, and the peripheral device bus masters are given next highest priority. The priority rankings of the peripheral device bus masters rotate each time a bus master is granted access to the bus. The microprocessor is given lowest bus access priority except when an interrupt signal must be serviced.

U.S. Pat. No. 5,016,114 discloses a digital copier apparatus with external laser card storage and image compression. In one embodiment of the invention a processor bus is coupled with a main bus and a local bus. An IIT/IOT module, an MPU, a main storage section and an I/O control block are coupled with the processor bus. Additionally, a bit map memory, a compander, a DMAC, a buffer memory and a laser card module are coupled with the main bus. Finally the bit map memory, the compander and the DMAC are also coupled with the local bus. In one example, the buffer memory can be omitted and the compander can be integrated with a FIFO buffer. When the compander and the FIFO are integrated, the buffer memory can be omitted and image data can be fed continuously to the laser card module.

U.S. Pat. No. 5,021,892 discloses an image processing device for controlling data transfer comprising an image scanner, an image printer, a facsimile control unit, a multi-purpose bus, a bidirectional parallel interface unit, and a main CPU. Data can be moved among various input/output units of the device by way of the main CPU. Moreover, the device includes a memory, the memory including a table of I/O codes. The I/O codes can be used to express predetermined combinations of the input/output devices between which data can be transferred.

U.S. Pat. No. 5,027,221 discloses a digital image recording system comprising an IIT, an IOT, a compressor/decompressor arrangement, a controller and a storage unit. The IIT and IOT are coupled with the controller by way of a first bus so that scanning and printing rates of the recording system can be controlled by the controller, while the compressor and decompressor are coupled with the controller by way of a second bus so that compression/decompression rates can be controlled by the controller. The storage unit communicates with the IIT and compressor for permitting temporary or long-term storage of image data generated at the IIT.

U.S. Pat. No. 5,038,218 discloses a digital copying apparatus comprising a video processor coupled with a plurality of input devices and a plurality of output devices. Each input device is selectively coupled with the video processor by way of an input selector while each output device is selectively coupled with the video processor by way of an output selector. The video processor comprises a main control circuit, the main control circuit communicating with the input and output selectors as well as a DMAC, a memory section, a plurality of image manipulation devices and a plurality of input/output devices.

The following patents relate generally to electronic reprographic systems, and may be of pertinence to the present discussion:
U.S. Pat. No. 4,169,275
Patentee: Gunning
Issued: Sep. 25, 1979
U.S. Pat. No. 4,205,350
Patentee: Gunning
Issued: May 27, 1980
U.S. Pat. No. 4,672,186
Patentee: Van Tyne
Issued: Jun. 9, 1987

U.S. Pat. Nos. 4,169,275 and 4,205,350 each disclose a reproduction scanning system having intermediate storage between input and output scanning stations wherein an input document is scanned in first and second directions, the first direction being orthogonal to the second direction, and the electrical signals being representative of information on the scanned document stored on an intermediate storage member. The information stored in the intermediate storage member may be read out and reproduced on a reproducing medium.

U.S. Pat. No. 4,672,186 discloses a document scanning system which scans printed documents for subsequent storage, retrieval and manipulation. A computer interfaces with a computer I/O bus and printer interface. The computer also controls the operation of a video terminal subsystem through a buffer interface and a synchronous data link control master. A high speed transport system is employed to transport individual documents through image capture stations, machine readers, encoders and sorters.

It would be desirable to provide a video processor that is adapted for use in a multi-functional printing apparatus. In particular, the video processor would have a data bus to which a plurality of input/output (I/O) devices would be selectively coupled. Moreover, the video processor would be provided with an arrangement permitting suitable bus access for each of the I/O devices within a relatively brief time interval. Finally, the I/O devices would be prioritized by the arrangement so that bus access would be granted in an orderly fashion.

SUMMARY OF THE INVENTION

In accordance with the present invention, an improved printing machine, of the type in which image data, addresses and control data can be substantially concurrently transferred across multiple multipurpose buses, is provided. The printing machine comprises a first multipurpose bus adapted to substantially concurrently transfer a first set of the image data, addresses and control data and a second multipurpose bus adapted to substantially concurrently transfer a second set of the image data, addresses and control data. A module for processing the first and second sets of data communicates with the first and second multipurpose buses while a first discrete input/output module communicates with the first bus. Both the first processing module and the first discrete input/output module are adapted to transfer the first set of data between one another. A second discrete input/output module communicates with the second multipurpose bus and a third discrete input/output module communicates with the second multipurpose bus. Both the second and third discrete input/output modules are adapted to transfer the second set of data between one another. Preferably, the first set of data can be transferred between the processing module and the first discrete input/output module substantially concurrent with the second set of data being transferred between the second discrete input/output module and the third discrete input/output module.

In one aspect of the present invention, the printing machine further comprises a third multipurpose bus adapted to substantially concurrently transfer a third set of the image data, addresses and control data. A second processing module for processing the third set of data communicates with the third multipurpose bus while a fourth discrete input/output module communicates with the third multipurpose bus. Both of the second processing modules and the fourth discrete input/output module are adapted to transfer the third set of data between one another. Preferably, the third set of data can be transferred between the second processing module and the fourth discrete input/output module substantially concurrent with both the first set of data being transferred between the first processing module and the first input/output module and the second set of data being transferred between the second discrete input/output module and the third discrete input/output module.

Numerous features of the printing machine of the present invention will be appreciated by those skilled in the art.

One feature of the disclosed printing machine is that it is characterized by an exceedingly high level of concurrency. For example, in one preferred embodiment three separate sets of data can be substantially concurrently transferred across three separate multipurpose buses.

Another feature of the disclosed printing machine is that various subsystems, such as an IIT/IOT arrangement, a video processor, a facsimile apparatus, an image manipulation board, a page description language module and a user interface, can be respectively incorporated into discrete modular stand-alone units, each of which modular units can be added to or omitted from the printing machine in accordance with the user's desires. That is, in accordance with the user's specifications, the machine can be designed to range from simple to complex. Additionally, since each module can operated with its own dedicated software, timing dependency of the printing machine on a single system manager is decreased significantly.

Yet another feature of the disclosed printing machine is that it possesses a particularly flexible design. Accordingly a user can obtain a machine that not only provides a wide variety of functions through the use of the stand-alone input/output modules, but is capable of interfacing with, among other systems, a local area network.

DESCRIPTION OF PREFERRED EMBODIMENTS OF THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
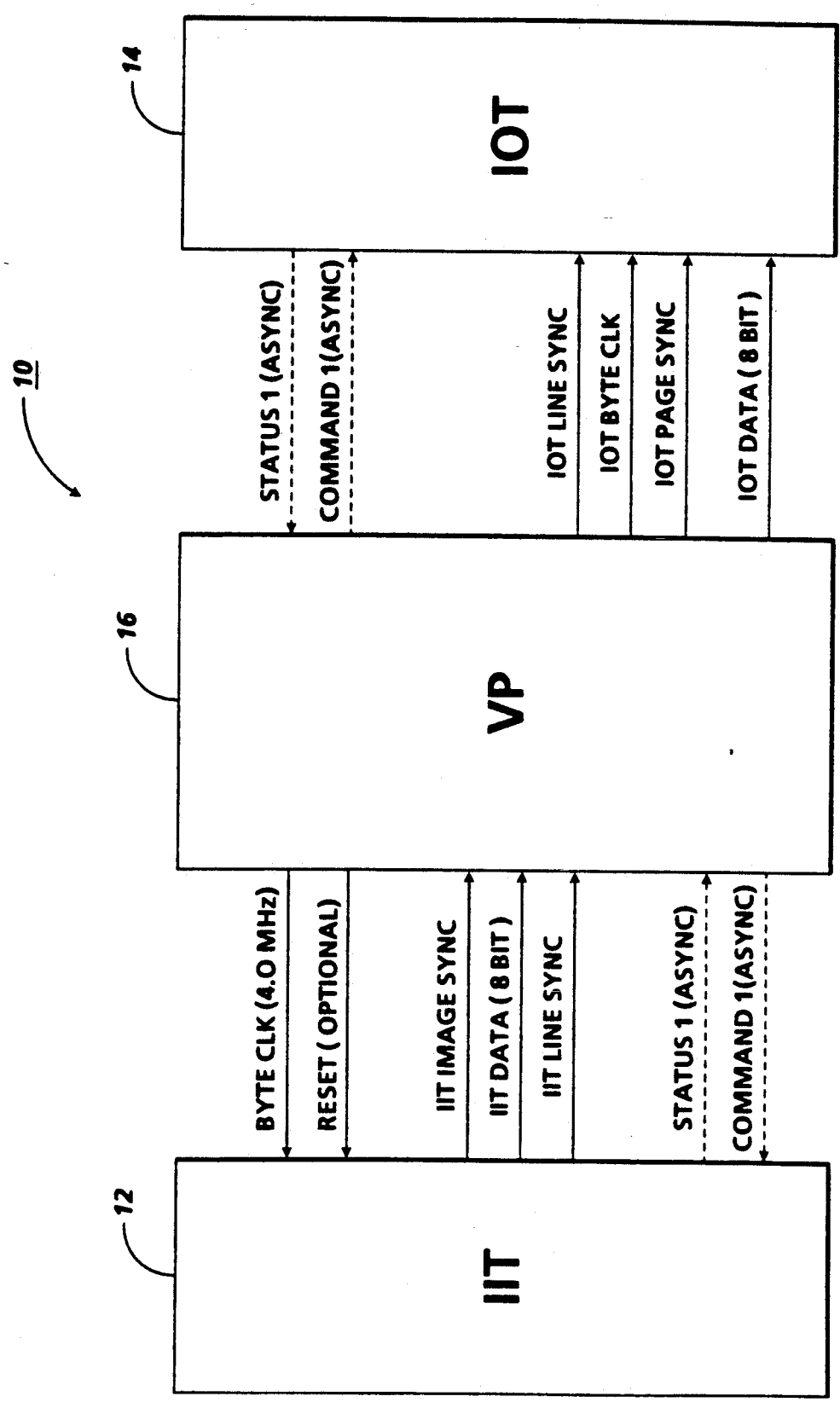
FIG. 1 is a schematic, block diagramatic representation of an apparatus including a video processor.
Figure 2:
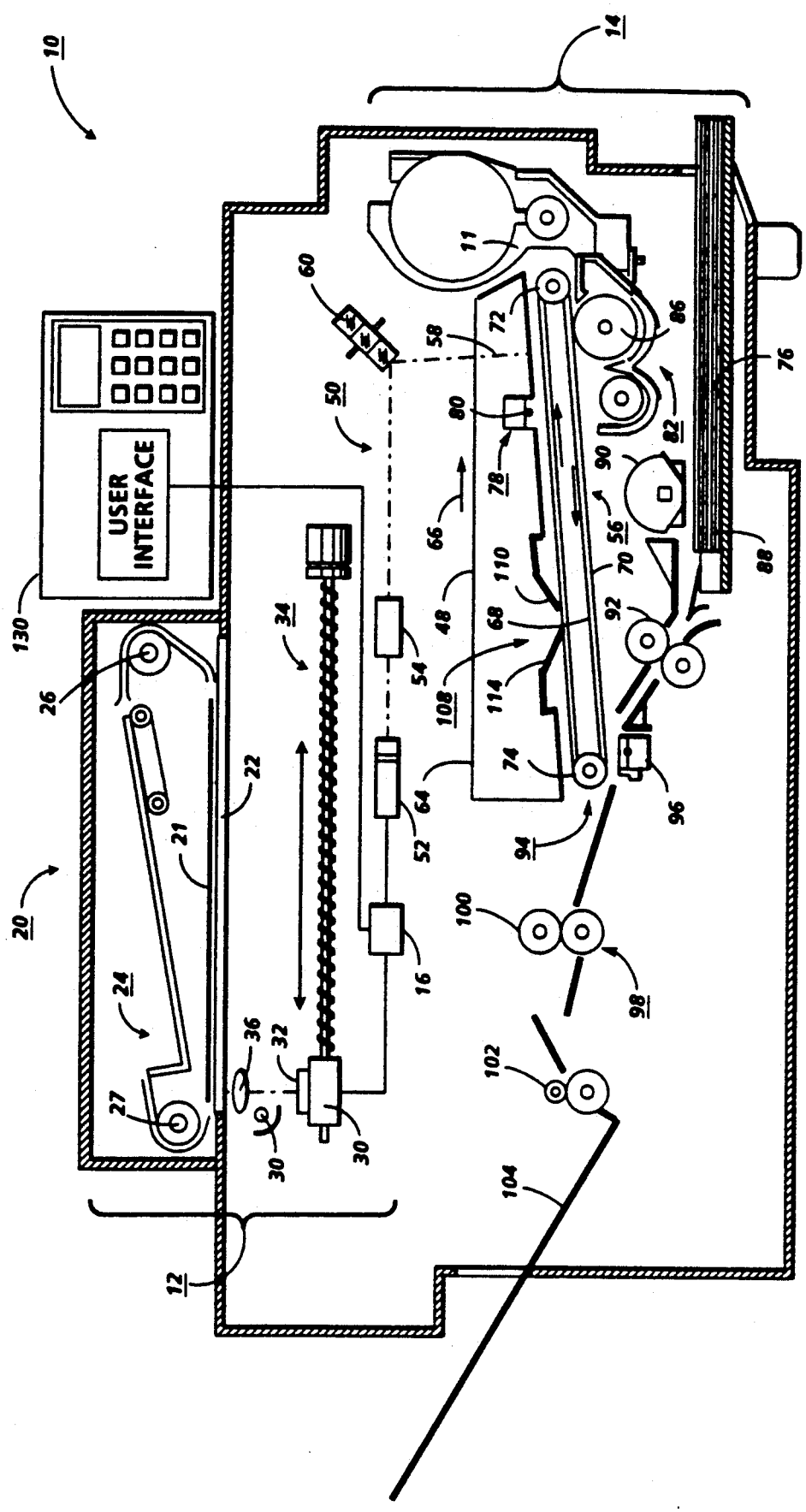
FIG. 2 is sectional, partially schematic view of the apparatus.

Referring to the drawings, in which like reference numerals designate identical or corresponding parts throughout the several views, and more particularly to FIGS. 1 and 2, there is shown an exemplary printing apparatus 10 for processing image data in accordance with the teachings of the present invention. Generally, the printing apparatus 10 comprises an image input terminal (IIT) 12, image output terminal (IOT) 14, and a video processor (VP) 16. Referring to FIG. 2, the IIT 12, the IOT 14 and the VP 16 are shown in a digital copying apparatus. As will be appreciated by those skilled in the art, the concepts underlying the printing apparatus 10 are applicable to many types of machines employing a scanning device coupled with a printing or output device.

For inputting image data, the IIT 12 (FIG. 2) includes a scanning section having an automatic document handler (ADH) 20 for automatically and sequentially placing one or more documents 21 on a transparent platen 22. In one example, the document 21 to be scanned is brought from a document tray 24 forward by the document handlers 26,27 into position on the platen 22 for scanning. Following scanning, the document 21 is returned to the document tray 24. While a particular document handler is shown, one skilled in the art will appreciate that other document handler types may be used instead or the documents 21 may be placed manually on the platen 22.

In the preferred embodiment, the scanning section of the IIT 12 employs one or more linear scanning arrays 30, which arrays 30 may comprise charge couple devices (CCDs) supported below and in scanning relation to the platen by a carriage 32. To scan a document placed on the platen 22, the carriage 32 can be reciprocated by reciprocating means 34, the reciprocating means 34 being similar to the reciprocating arrangement disclosed in U.S. Pat. No. 4,387,636 to Daniele et al., the pertinent portions of which patent are incorporated herein by reference. A suitable lens 36 is provided to focus arrays 30 on a line-like segment of the platen 22 and the documents resting thereon. A suitable lamp 38 illuminates the document line being scanned.

Figure 3A:
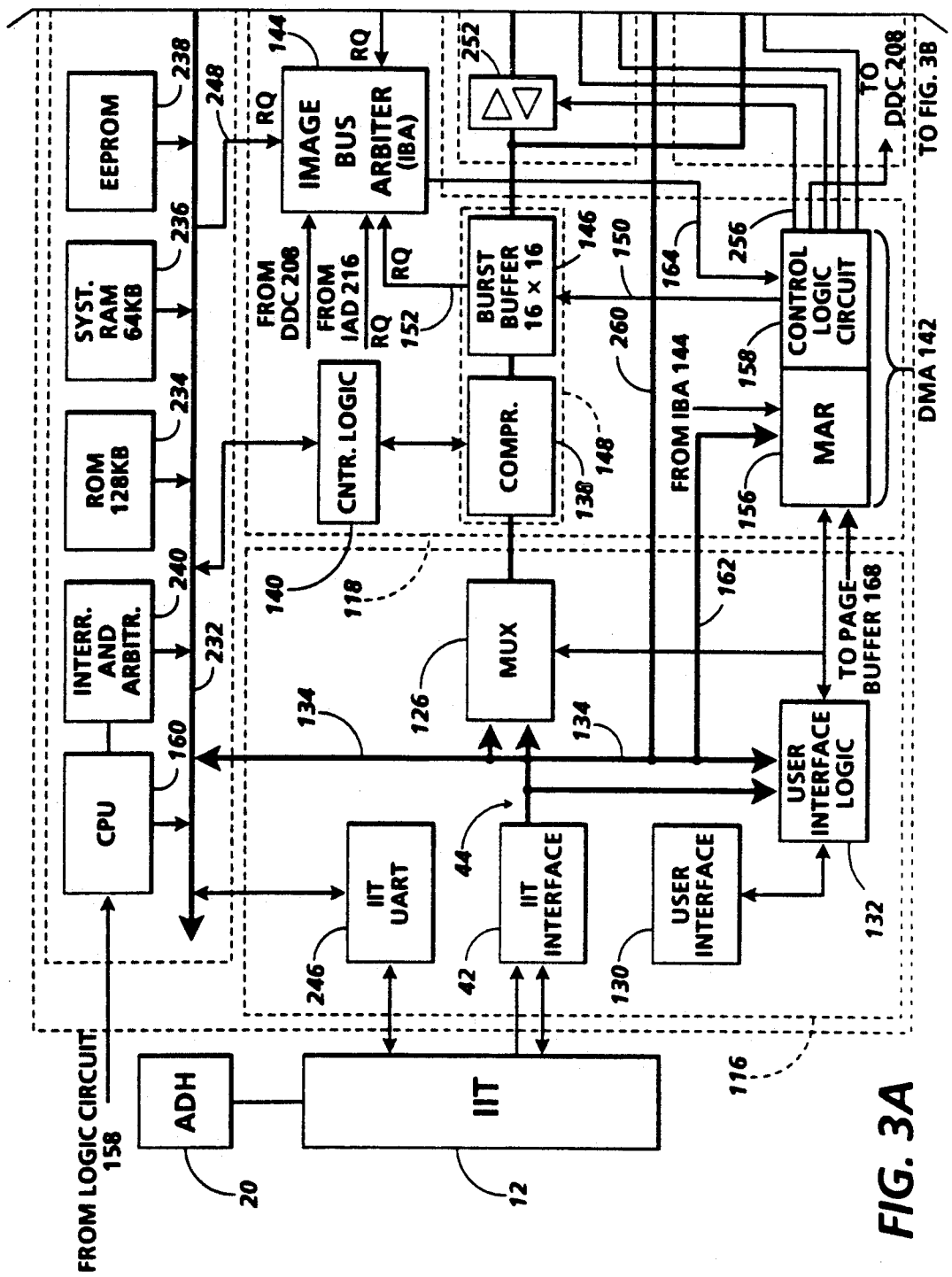
FIGS. 3A and 3B, viewed together, are a schematic, block diagramatic representation of the apparatus.
Figure 4:
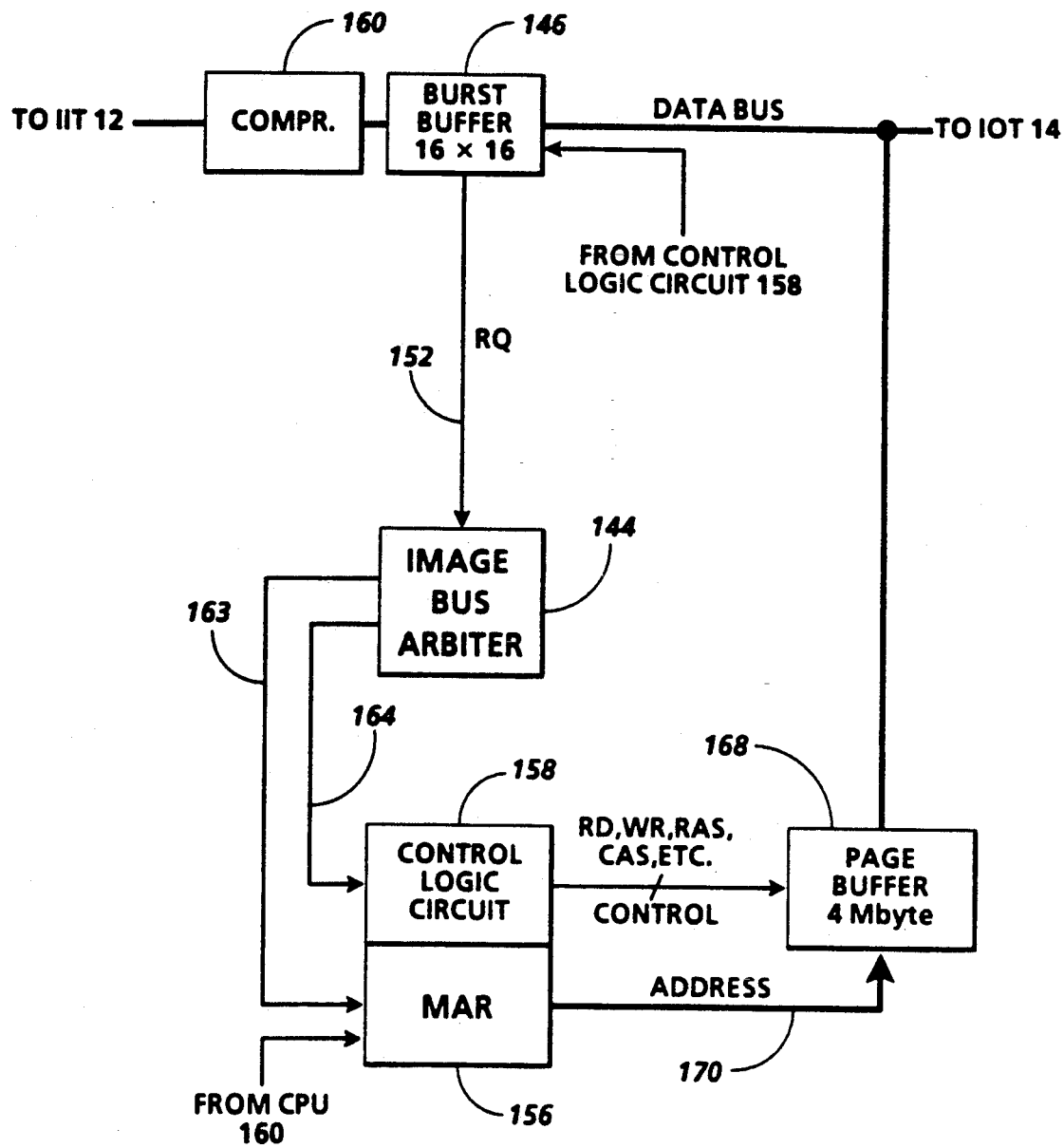
FIG. 4 is a partial view of the representation of FIGS. 3A and 3B.

Referring to FIGS. 3A and 4, arrays 30 provide electrical image data or pixels representative of the document image scanned which are inputted to the VP 16 across a suitable IIT interface 42. As will be understood, the image data may be used for purposes other than printing copies, as for example, the image data may be transmitted via a communication channel (not shown) to another location, or stored, etc. In the preferred embodiment, the interface 42 includes differential transmitters/receivers and appropriate control logic adapted to provide data/control flow between the IIT 12 and the VP 16. In the preferred embodiment, interface 42 provides for an 8 bit wide image data bus 44 having a constant transfer rate of 4 Mbytes/sec.

Image data is transmitted from the VP 16—the structure and operation of which VP 16 is explained in further detail below—to the IOT 14 by way of an IOT interface 46. Referring again to FIG. 1, the IOT 46 provides image data and control signal paths between the IOT 14 and the VP 16 as well as includes two two scan line deep ping-pong buffers (not shown), the ping-pong buffers preferably being two 2K×8 SRAMs. In the preferred form of operation, the image data is clocked out of the IOT interface 46 by way of a byte clock (not shown).

Referring specifically to FIG. 2, the structure and operation of the IOT 14 is explained in further detail. The IOT 14 includes a raster output scanner (ROS) 50 having a suitable source of high intensity light, such as laser 52, modulated in accordance with the content of the image data as by an acousto-optic modulator 54 to provide zero and first order imaging beams. The imaging beam is scanned across a photoreceptor 56 at an exposing station 58 by a scanning polygon 60 to expose the previously charged photoreceptor 56 and create a latent electrostatic image or the document represented by the image signals to modulator 54. Suitable means (not shown) are employed to focus the beam on the photoreceptor 56.

The printing apparatus 10 illustrated in FIG. 2 employs a removable processing cartridge 64 which may be inserted and withdrawn from the main machine frame in the direction of arrow 66. Cartridge 64 includes the photoreceptor 56, which in one example comprises a belt like member 68, the outer periphery of the belt like member 68 being coated with a suitable photoconductive material 70. The belt 68 is suitably mounted for revolution within the cartridge 64 about driven transport roll 72, around idler roll 74 and travels in the direction indicated by the arrows on the inner run of the belt to bring the image bearing surface thereon past the plurality of xerographic processing stations. Suitable drive means such as a motor, not shown, are provided to power and coordinate the motion of the various cooperating machine components whereby a faithful reproduction of the original input scene information is recorded upon a sheet of final support material 76, such as paper or the like.

Initially, the belt 68 moves the photoconductive surface 70 through a charging station 78 wherein the belt 68 is uniformly charged with an electrostatic charge placed on the photoconductive surface 70 by charge corotron 80 in known manner preparatory to imaging. Thereafter, the belt 68 is driven to the exposure station 58 wherein the charged photoconductive surface 70 is exposed to line-by-line scanning of the ROS 50, whereby the charge is selectively dissipated in the light exposed regions to record the original input image in the form of electrostatic latent image. The speed of the scanning carriage 32 and the speed of the belt 68 are synchronized to provide faithful reproduction of the original document.

After exposure of belt 68 the electrostatic latent image recorded on the photoconductive surface 70 is transported to development station 82, wherein developer is applied to the photoconductive surface 70 of the belt 68 rendering the latent image visible. The development station 82 includes a magnetic brush development system including developer roll 86 utilizing a magnetizable developer mix having course magnetic carrier granules and toner colorant particles.

Sheets 76 of the final support material are supported in a stack arranged on elevated stack support tray 88. With the stack at its elevated position, the sheet separator segmented feed roll 90 feeds individual sheets therefrom to the registration pinch roll pair 92. The sheet 76 is then forwarded to a transfer station 94 in proper registration with the image on the belt and the developed image on the photoconductive surface 70 is brought into contact with the sheet 76 of final support material within the transfer station 94 and the toner image is transferred from the photoconductive surface 70 to the contacting side of the final support sheet 76 by means of transfer corotron 96. Following transfer of the image, the final support material 76 is separated from the belt 68 by the beam strength of the support material 76 as it passes around the idler roll 74, and the sheet 76 containing the toner image thereon is advanced to fixing station 98 wherein roll fuser 100 fixes the transferred powder image thereto. After fusing the toner image to the sheet 76, it is advanced by output rolls 102 to sheet stacking tray 104.

Although a preponderance of toner powder is transferred to the final support material 76, invariably some residual toner remains on the photoconductive surface 70 after the transfer of the toner powder image to the final support material. The residual toner particles remaining on the photoconductive surface after the transfer operation are removed from the belt 70 by a cleaning station 108, which cleaning station 108 comprises a cleaning blade 110 in scrapping contact with the outer periphery of the belt 68 and contained within a cleaning housing 112, the cleaning housing 112 having a cleaning seal 114 associated with the upstream opening of the cleaning housing 112. Alternatively, the toner particles may be mechanically cleaned from the photoconductive surface by a cleaning brush as is well known in the art.

Figure 3B:
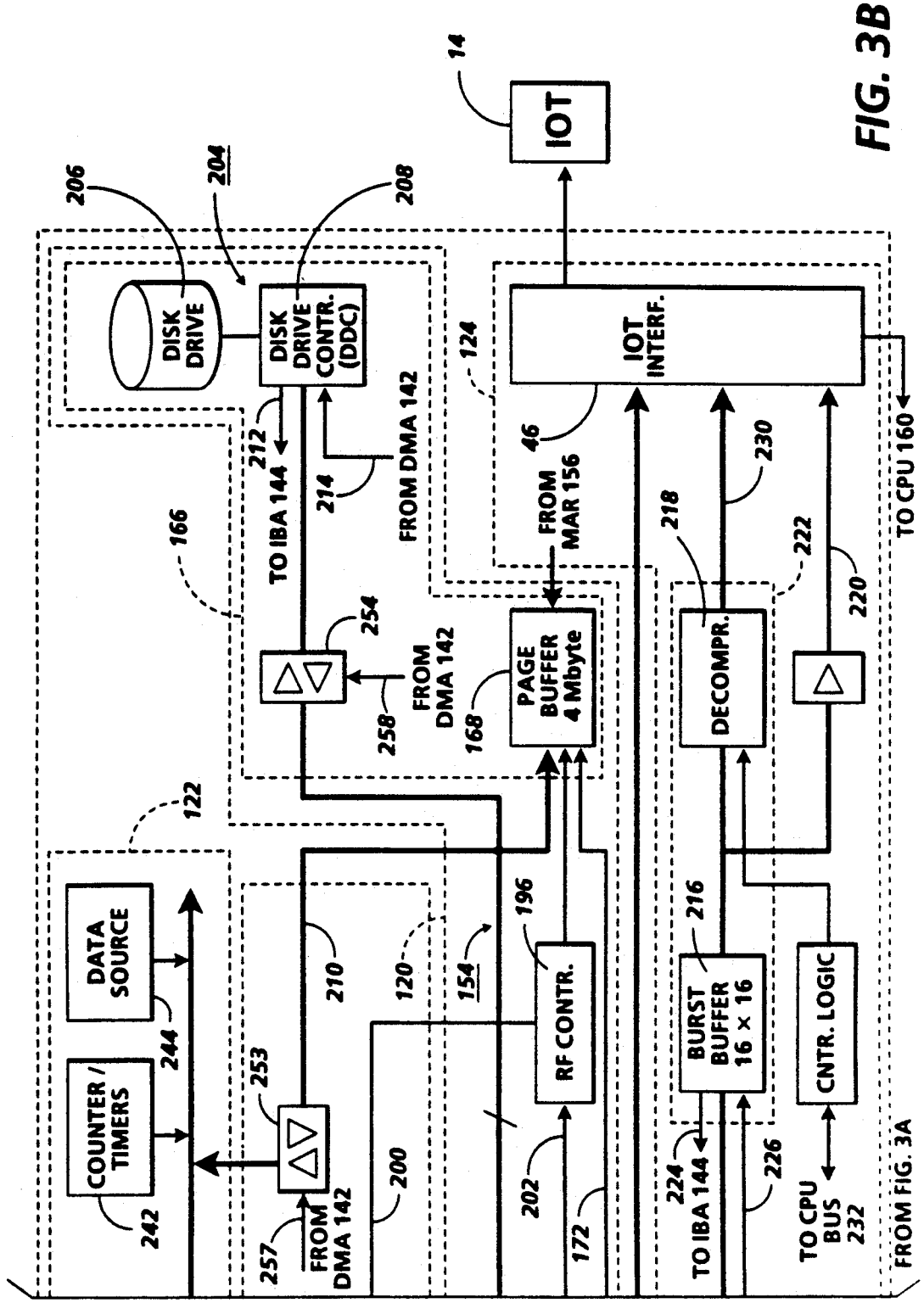

Referring to FIGS. 3A and 3B, the structure of the VP 16 is explained in further detail. The VP 16 comprises an input network 116, a first memory interface network 118, a memory network 120, a computer network 122 and a second memory interface network 124. The input network 116 comprises a multiplexor (MUX) 126 as well as a user interface (UI) 130 coupled with suitable UI logic circuitry 132. A 16-bit bus 134 allows the MUX 126 and the UI logic circuitry 132 to communicate with the computer network 122. Additionally, the 8-bit image data bus 44 communicates with the MUX 126 and the UI logic circuitry 132. In one example, the UI 130 includes conventional control circuitry coupled with a CRT, the control circuitry being adapted to initiate operation of the printing apparatus 10 in a known manner.

The first memory interface network 118, which network 118 (FIG. 3) includes a compressor 138 coupled with the computer network 122 by suitable control logic circuit 140, a direct memory access (DMA) circuit 142, an image bus arbiter 144 and a burst buffer 146. In the preferred embodiment, the compressor 138 comprises conventional components of the type suitable for use with the adaptive algorithm disclosed in U.S. Pat. No. 4,559,563 (to Joiner, Jr.)("'563 patent"), the pertinent portions of which are incorporated herein by reference. Additionally, the control logic 140 can comprise a known I/O device, such as the 8255 I/O port manufactured by Intel, Corp. One purpose of the compressor 138 is to maximize the rate at which data can be transmitted to the memory network 120. In the preferred form of operation, compression ratios of up to 30:1 have been achieved.

In the preferred embodiment, the compressor 138 is coupled with the burst buffer 146 as an integrated adaptive compressor (IAC), the IAC being designated by the numeral 148. While the illustrated burst buffer 146 of FIG. 3 is a "first in/first out (FIFO)" type buffer having a capacity of 64 Bytes, in other contemplated embodiments ping-pong buffers, such as the ones used in the IOT interface 46, could be substituted for the FIFO burst buffer 146. As is conventional 8 bit bytes inputted to the IAC 148 by way of bus 44 can be combined into 16 bit bytes for transmission to the memory section 120. The IAC 148 is interconnected with the DMA circuit 142 by a control line 150, and with the IBA 144 by way of a request line 152.

Image data, in the form of 16-bit bytes are transmitted through the memory network 120 by way of a 16 bit bi-directional image bus 154. Transmission of the image data from the IAC 148 is accomplished by use of the DMA circuit 142. Referring to FIG. 4, the DMA circuit 142 includes a memory access register (MAR) 156 and a control logic circuit 158, the control logic circuit 158 being adapted to transfer image data to and from I/O components, such as the IAC 148. As will be explained in further detail below, programming of the MAR 156 is achieved by use of the computer network 122, and more specifically with a CPU or MPU 160. In the illustrated embodiment of FIG. 4, the MAR 156 is packaged with control logic circuit 158, and the MAR 156 (FIGS. 3 and 5) is coupled with the CPU 160 by way of a data bus 162 (PD00-PD15). Additionally, the MAR 156 and the control logic circuit 158 are coupled with the image bus arbiter 144 by way of respective control lines 163, 164.

Referring still to FIGS. 3 and 4, the memory network 120 includes a memory section 166 having a page buffer 168, the page buffer 168 being interconnected with the MAR 156 by a 24-bit address bus 170, and with the control logic circuit 158 by a control line 172. As will be explained in further detail below, read, write and other appropriate page buffer control signals can be transmitted across the control line 172 in response to commands transmitted by the IBA 144 to the control logic circuit 158.

Figure 5:
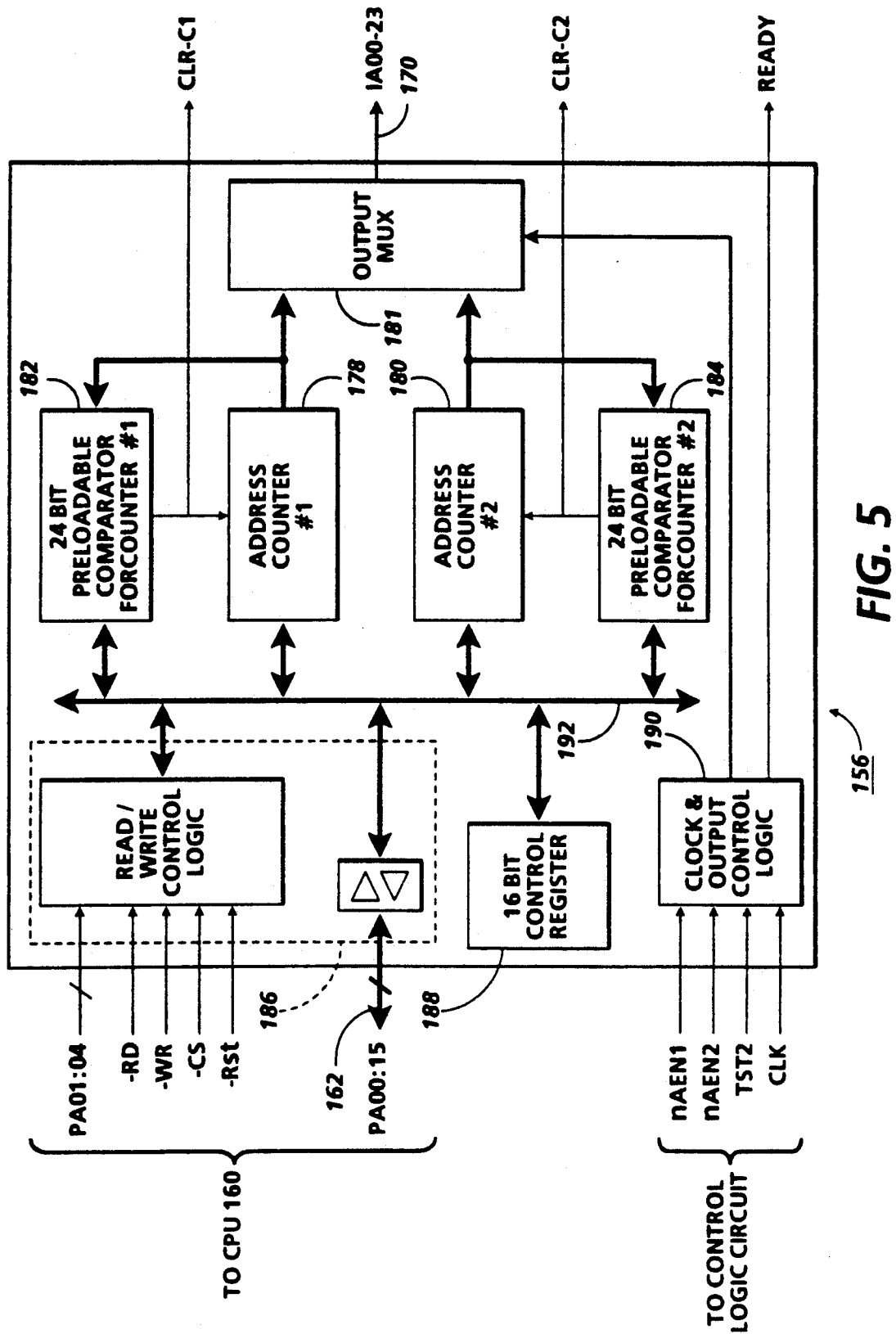
FIG. 5 is a schematic, block diagramatic representation of a memory access register (MAR) shown in FIGS. 3A and 4.

Referring specifically to FIG. 5, the structure of the MAR 156 is described in further detail. The illustrated MAR 156 includes a first address counter 178 and a second address counter 180, both of which counters 178,180 are selectively coupled with the address bus 170 by way of a 2:1 MUX 181, the MUX 181 having a tri-stated output. Additionally, a first 24-bit preloadable comparator 182 and a second 24-bit preloadable comparator 184 are respectively coupled with the address counters 178,180. Each of the comparators 182,184 is adapted to set the beginning and finishing addresses of the address counter to which it is coupled.

In the preferred embodiment, each of the counters 178,180 and the comparators 182,184 is coupled with an MPU interface 186, a control register 188, as well as a clock output and control logic circuit 190, by way of a suitable bus 192. As shown in FIG. 5, the MPU interface 186 preferably comprises various control lines which permit control of the MAR 156 by the CPU 160. For example, the four address lines PA1-PA4 can be used to set each internal register of the MAR 156, while the 16-bit bi-directional data bus lines of bus 162 can be used to provide control data for the control register 188. Moreover, the control register 188 is divided into two sections, with one section being dedicated to the first counter 178, and the other section being dedicated to the second counter 180. Finally, the clock output and control logic circuit 190, which can provide a clock rate of up to 32 MHz, is adapted to select which of counters 178, 180 is to be placed on the address bus 170 to count from one address to another.

Referring again to FIGS. 3A and 3B, to provide cost saving, dynamic random access memory (DRAM) can be used to comprise the page buffer 168. Preferably the page buffer 168 has 4 Mbytes of DRAM. As will be appreciated by those skilled in the art, DRAM is a relatively inexpensive alternative to static RAM. When using DRAM, periodic refreshment is generally required by, for example, a conventional refresh control device ("RF controller") 196, which device 196 can be coupled with the page buffer 168 by way of the image data bus 154. The RF controller 196 communicates with the IBA 144 via request line 200, and with the control logic circuit 158 via a control line 202.

In those embodiments in which large quantities of data are to be stored in the memory section 166, a disk drive module 204 is disposed on the image data bus 154. The disk drive module 204 includes a disk drive 206, such as a "Winchester"-type hard disk drive with 50

Mbyte capacity, coupled with a disk drive controller ("DDC") 208. Further information regarding the structure and operation of the disk drive controller 208 is discussed in [Disk Drive Controller Application]. In the preferred embodiment, the module 204 communicates with the page buffer 168 via the image data bus 154, as well as with the computer network 122 via the image bus 154 and an intermediate bus 210. Additionally, the disk drive controller 208 is coupled with the IBA 144 by way of request line 212, and with control logic circuit 158 by way of control line 214.

The second memory interface network 124 comprises a burst buffer 216, a decompressor 218 and an 8-bit raw data bypass bus 220. In the preferred embodiment the burst buffer 216 is structurally equivalent to the burst buffer 146, and the decompressor 218 is part of the same IC package as the compressor 138. As with IAC 148, the burst buffer 216 is preferably coupled with the decompressor 218 to form an integrated adaptive decompressor (IAD) 222. The IAD 222 is coupled with the IBA 144 by way of request line 224, and with control logic circuit 158 by way of control line 226. The output of the burst buffer 216 is preferably 8-bit and the decompressor 218 is on an 8-bit data bus 230. The output of the decompressor 184 can be transmitted to the IOT interface 46 for printing, in a known manner, at the ROS 50.

The computer network 122 includes the CPU 160 coupled with a 16-bit CPU bus 232. In the preferred embodiment, the CPU 160 comprises a Motorola 68020 microprocessor capable of operating at a clock frequency of 10 MHz. Additionally the CPU bus 232 preferably comprises a 16-bit wide data bus, 23-bit wide address bus and control lines. Various types of memory, namely a ROM device 234, a system RAM device 236 and an EEPROM device 238, are respectively coupled with the CPU bus 232 to support the CPU 160 in a known manner. A local interrupt and arbitration device 240 as well as a counter(s)/timers section 242 are coupled to the CPU bus 232 to facilitate management and operation of the CPU bus 232 in a known manner.

It should be appreciated that an input device or data source 244, such as a workstation or another scanner can be coupled to the CPU bus 232 so that data can be inputted to the memory section 166 concurrent with other I/O operations, such as accumulating image data in the burst buffer 146. Those skilled in the art will recognize that when certain input devices 244 are coupled to the CPU bus 232, such as a workstation, a suitable interface is preferably employed to achieve suitable coupling. Referring still to FIGS. 3A and 3B, the CPU 160 can be interconnected with the IIT 12, by an IIT universal asynchronous receiving/transmitting (UART) device 246. For the illustrated embodiment of FIG. 3, the CPU 160, as well as any device coupled to the bus 232, can use the CPU bus 232 and a request line 248 to seek access of the image data bus 154 through the IBA 144. The CPU 160 is coupled to the control logic circuit 158 by way of buses 134, 162 and 232.

It should be appreciated that the CPU 160 represents the "brains" of the VP 16. First, the CPU 160 serves as an operating system for the VP 16 in that it is responsible for, among other things, system initialization, "housekeeping," system management and communication with I/O devices. In particular, the CPU 160 serves as a diagnostic tool for VP 16—transmitting diagnostic signals through the MUX 126 and receiving feedback signals across the buses 210, 232. Second, as explained in further detail below, the CPU 160 plays a major role in facilitating data transfer by way of its communication with the DMA 142 across data bus 162. Third, the CPU 160 is capable of transferring data with the UI 130 and/or the page buffer 168 for manipulating image data. For instance, the CPU 160 has registers in which various known digital operations, such as resolution conversion and data rotation, can be performed on the image data. Finally, since the CPU 160 is in direct communication with the page buffer 168, by way of bus 210, the CPU 160 can transfer data with the page buffer 168 independent of the IAC 148. Consequently, data can be transferred directly between the page buffer 168 and the CPU 160 while image data is being accumulated in the burst buffer 146.

To optimize the bandwidth capability of the image data bus 154, data can be selectively transmitted to and from the page buffer 168 with the aid of transceivers 252-254. In one example, the transceivers 252-254 are coupled to the control logic circuit 158 by way of respective control lines 256-258 so that the direction of each of transceivers 252-254, and accordingly the direction of data flow on the data bus 154, can be alternated programmably. Preferably, each of the transceivers comprises a 74F245 bi-directional transceiver manufactured by Texas Instruments, Inc.

As mentioned above, the image data transmitted to IOT interface 46 from page buffer 168 can be printed, in a known manner, at IOT 14. Storing one or more pages of image data before printing, however, can cause some delay in printing. To eliminate such delay, the VP 16 is provided with a "direct data bus" 260, the bus 260 coupling the IIT interface 42 directly with the IOT interface 46. Accordingly, when the input rate of the IIT 12 is synchronized relative to the output rate of the IOT 14, line-by line synchronous input/output operations can be achieved.

Figure 6:
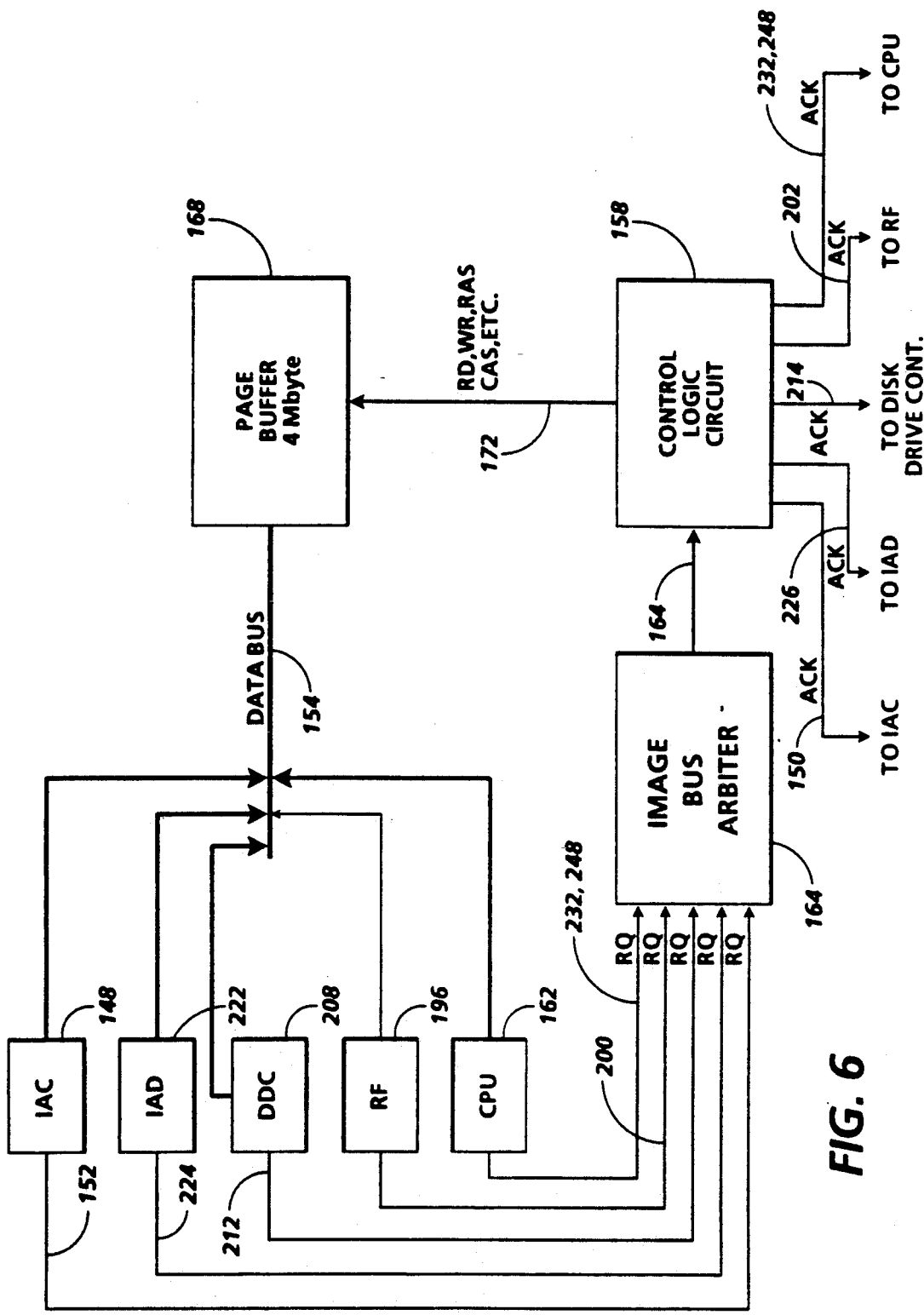
FIG. 6 is a partial view of the representation of FIGS. 3A and 3B.

Now that all of the structure of the VP 16 has been mentioned, the sequencing role of the IBA 144 can be more fully understood. In the preferred embodiment the IBA 144 is implemented by way of a state machine, namely a Field Programmable Array, such as the PAL 82S105 manufactured by Signetics, Corporation. Referring to FIG. 6, the relationship of the IBA 144 to varios I/O components as well as to the control logic 158 and the page buffer 168, is shown. To seek access to the image data bus 154, and accordingly the page buffer (PB) 168, one or more of the IAC 148, the CPU 160, the RF controller 196, the disk drive controller (DDC) 208, the IAD 222 transmit request signals across respective request lines 152, 248, 200, 212 and 224 to the IBA 144.

In response to software adapted for use with the 82S105 Array, the IBA 144 designates the order in which the above-mentioned components can access the bus 154. More specifically, the IBA 144 causes the control logic circuit 158 to by transmit an appropriate control signal across one of control lines 150, 202, 214, 226 and 250 for selectively permitting one of the above-mentioned components to access the bus 154. As the control logic circuit 158 transmits the appropriate control signal to the designated one of the above-mentioned I/O components, it also transmits information to the page buffer 168, by way of control line 172, regarding which component has been permitted access to the bus 154. It will be appreciated by those in the art that while the sequencing arrangement has been shown with five components, in other contemplated embodiments additional components could be sequenced and controlled by the arrangement of the IBA 144 and the control logic circuit 158 without altering the concept disclosed by the present description.

Figure 7:
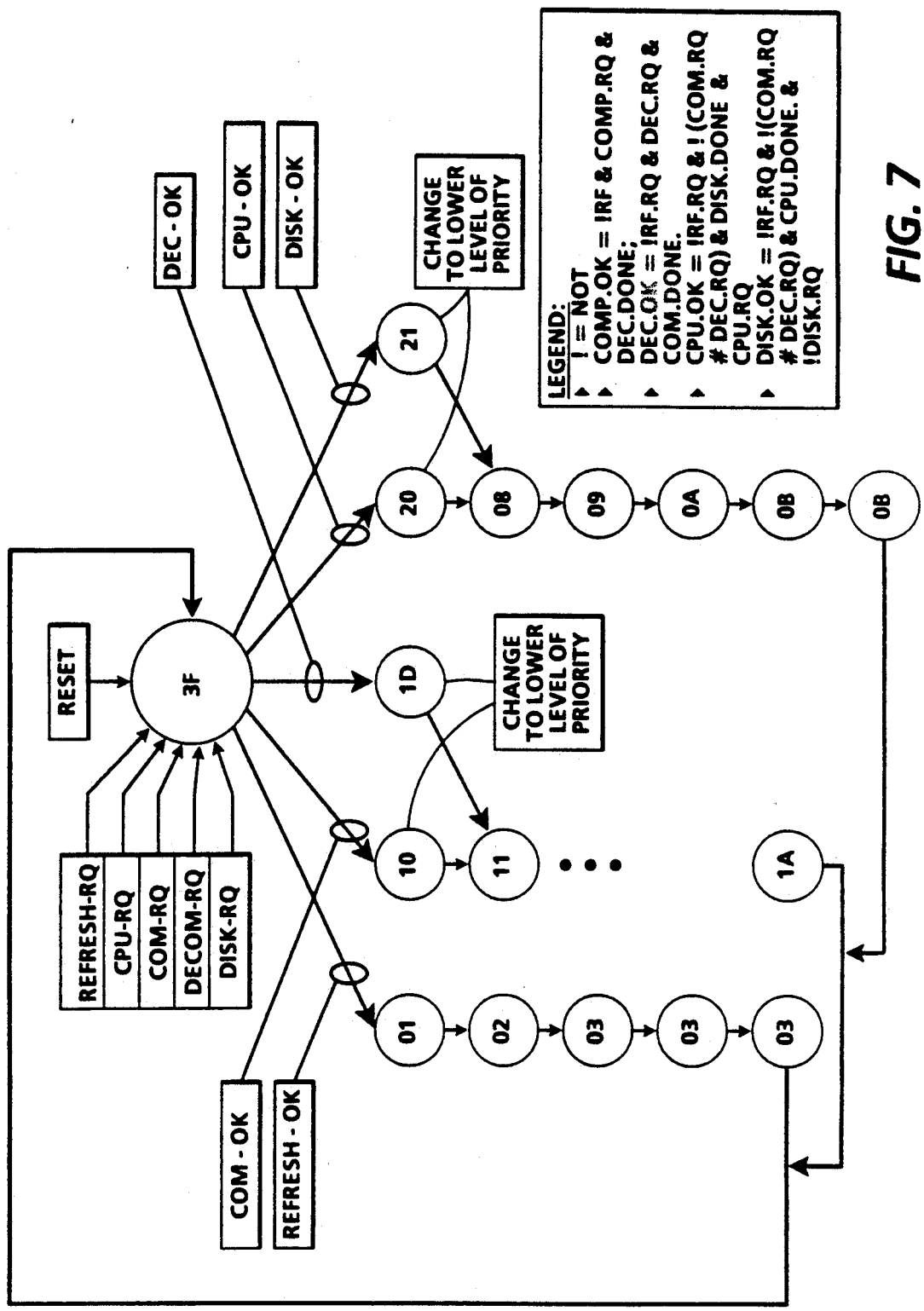
FIG. 7 is a state diagram of the image bus arbiter shown in FIGS. 3A, 4 and 6.

Referring to FIG. 7, the concept underlying the software employed to implement the IBA 144 is discussed in further detail. As will be recognized by those familiar with state diagrams, the numbered "bubbles" represent states through which a state machine can pass. Programming of the PAL 82S105 to accomplish the software of FIG. 7 is known to those skilled in the art. For the example of FIG. 7, in which arbitration is achieved for just five inputs, the PAL of the IBA 144 is driven by a 25 MHz clock and all input signals are synchronized with the clock so that the arbitration time is less than 40 ns. In this example, the priorities of the devices coupled to the IBA 144 are assigned as follows:

| RF 196 | #1 |
|---|---|
| IAC 148/IAD 222 | #2 |
| DDC 208 | #3/#4 |
| CPU 160 | #3/#4 |

As can be recognized, the priorities of the RF 196 as well as IAC 148 and IAD 222 are fixed, while the priorities of the DDC 208 and the CPU 160 are rotated after each data transfer. As will be appreciated from the following discussion, the concept underlying the arbitration process is not affected by the order of priority in which the above-mentioned devices are set. Referring to FIG. 7, the sequencing and rotating capacity of the IBA 144 is explained in further detail. When a request is received at state 3F from one of the five devices, the state machine determines whether a higher priority request is being serviced. For instance, if the IAC 148 or IAD 222 seeks access to the bus 154, the machine checks to see if states 01-03 for the RF 196 are being executed. Assuming that the RF 196 is being serviced, the machine waits until the service routine for the RF 196 to be completed before proceeding to step 10 or 1D. Similarly, if the DDC 208 or the CPU 160 requests access to the bus 154, the machine determines whether the RF 196, the IAC 148 or the IAD 222 is being serviced before proceeding. The sequencing scheme of the arbitration example is elaborated on more completely in the Legend of FIG. 7.

Referring still to FIG. 7, the rotation of the IAC 148 and IAD 222 as well as the DDC 208 and the CPU 160 is achieved by the setting of a "flag." In one example, a request arrives for the IAC 148, the machine proceeds from states 3F to 10 and sets a flag so that the priority of the IAC 148 is set below the priority of the IAD 222. Accordingly, after the process returns to state 3F, if requests are received from IAC 148 and IAD 196 within about the same preselected time interval, the process continues through states 1D-1A rather than 10-1A. Upon proceeding to state 1D, another flag is set so that the priorities of the IAC 148 and IAD 196 are again rotated. Bearing in mind the above example, it will be recognized that the same flag setting approach can be used in servicing the DDC 208 and the CPU 160.

Figure 8:
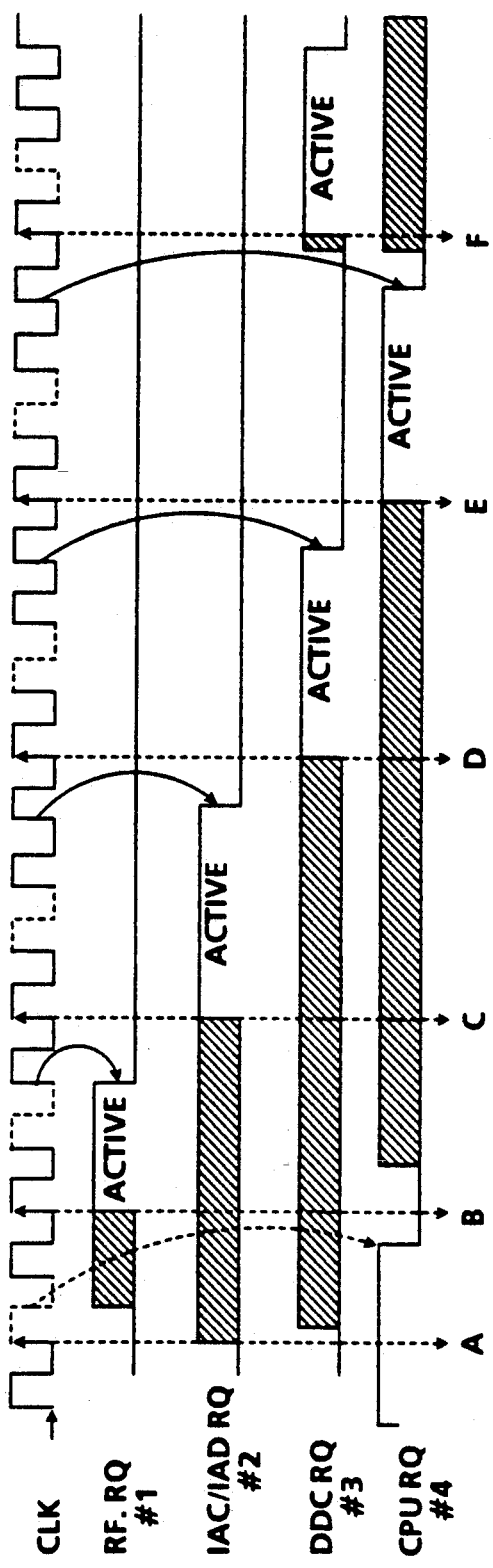
FIG. 8 is a timing diagram demonstrating an exemplary case of operation of the image bus arbiter.

Referring to the timing diagram of FIG. 8, another example of the rotation approach is discussed with greater specificity. The exemplary process begins with the CPU 160 transferring data to the page buffer 168 (active). In the time interval between a and b, the RF 196, the IAC 148, the IAD 22 and the DDC 208 request access to the bus 154. The IBA 144 waits until the CPU 160 transfer is completed and then grants the bus 154 (at time b) to the device having the highest priority, i.e. the RF 196. The IAD 148 or the IAD 222 and the DDC 208 wait until RF 196 has completed its transfer. After the DDC 208 has accessed the bus 154 between times d and e, its priority changes to #4 and at time e the CPU 160 accesses the bus 154. After the CPU 160 has made its second transfer (between times e and f) its priority is changed to #4 and the priority of the DDC 208 is shifted back to #3. Accordingly, at time f, when a concurrent request for the bus 154 comes in from the DDC 208 and the CPU 160, access to the bus 154 is granted to the DDC 208.

Figure 9:
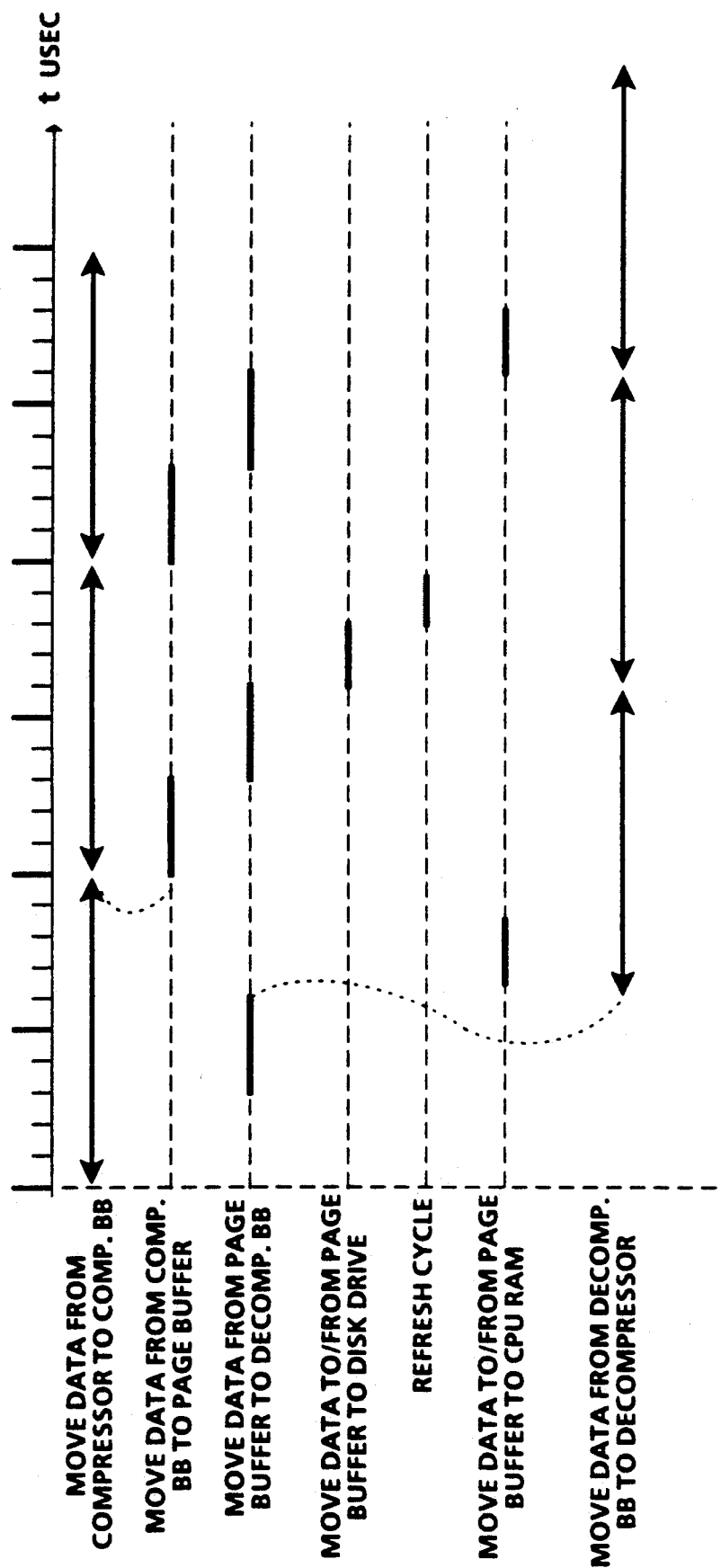
FIG. 9 is a timing diagram demonstrating an exemplary case of operation of the video processor.

Operation of the printing apparatus 10 can be further understood by reference to the exemplary timing diagram FIG. 9. As will be appreciated by those skilled in the many modes of operation, other than the mode of operation discussed below, can be achieved with the various systems and subsystems of the printing apparatus 10 disclosed thus far. To initiate a print job for one or more originals, the parameters of the job, such as number of prints to be made, size of each print, etc., are fed into the UI 130, and the parameters are transmitted accordingly to the CPU 160 by way of bus 134. Prior to transmitting an appropriate scan signal to the scanning section of IIT 12 by way of the IIT UART 246, and a print signal to the IOT interface 46, the CPU 160 communicates with the MAR 156 (FIGS. 3 and 6), by way of data bus 162, to allow for the configuring of addresses in the page buffer 168, the addresses being the 24-bit locations at which image data are stored.

Figure 10:
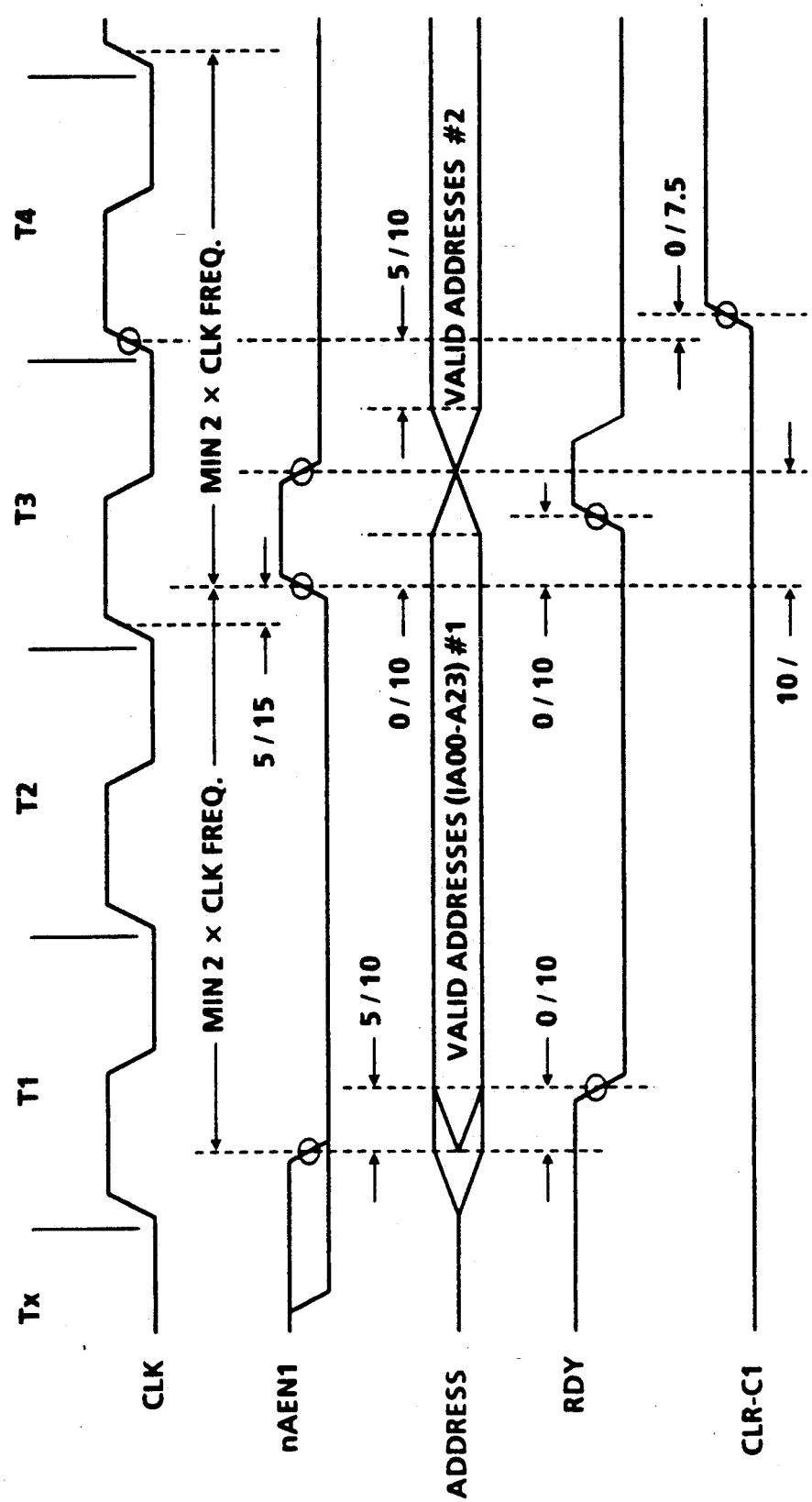
FIG. 10 is a timing diagram demonstrating the use of an address counter to generate addresses for a page buffer.

Upon loading the address counters 178,180 (FIG. 5) and the comparators 182,184 with suitable beginning and finishing addresses, by way of CPU interface 186, the scan signal is transmitted to the scanning section of IIT 12. As each line is scanned, the corresponding image data is transmitted to the IAC 148, by way of the MUX 126, and to the IOT interface 46, by way of the direct data bus 260. Referring again to FIG. 9, each byte of image data transmitted to the IAC 148 is compressed, using the adaptive algorithm of U.S. Pat. No. 4,559,563, and temporarily accumulated in the burst buffer 146. As shown in FIG. 9, image data can be written in or read from the page buffer 168 as image data is being accumulated in the burst buffer 146. Referring to FIGS. 4, 5 and 10 it will be understood how a byte of image data is written in the page buffer 168. To move a byte of image data from the burst buffer 146, the IAC 148 seeks access to the bus 154 through the IBA 144.

Assuming that the RF 196 does not need the bus 154, the IBA 144 causes the control logic circuit 158 to synchronously transmit three signals to the IAC 148, the MAR 156 and the page buffer. As a result of the first signal being transmitted to the MAR 156, the enabling signal, nAEN1 goes low and a valid address #1 is "pointed to" by the counter 178. While the counter 178, or what may be thought of as the pointer 178, is at the designated address, the second signal, which is transmitted across control line 150, allows the IAC 148 to access the bus 154 so that the image data byte is transferred to the designated address. In response to the third signal transmitted across line 172, the page buffer 168 stores the byte at the designated address.

After nAEN1 goes low, and the RDY signal goes low, the process can be repeated as many times as may be required to transfer a preselected group of bytes. Each time a byte is transferred to the page buffer 168, the address counter 178 advances to the next address location in the page buffer 168 on the rising edge of nAEN1. If the data in the comparator 182 is equal to the count in the counter 178, CLR-C1 will go active active no later than 7.5 ns after the rising edge of the clock. CLR-C1 will stay active until the address in the counter 178 has been placed onto the output bus 170. Subsequently, when nAEN1 goes high, the counter 178 will be reset.

When the above-described process is repeated for a plurality of bytes, the image data is transferred in a rapid transfer mode known as a burst mode. That is, the above-described pointing or counting arrangement, which is commonly referred to as "direct memory access (DMA)," moves data at rates that far exceed those of conventional microprocessor-controlled arrangements. As will be appreciated by those skilled in the art, DMA allows the CPU 160 to perform a wide variety of system control operations without being interrupted to effect image data transfer.

In the preferred form of operation, up to eight (8) 16-bit bytes are accumulated in the burst buffer 146 of the IAC 148, and after buffering the eighth byte, four of the first-collected bytes are transferred to the page buffer 168 in the burst mode. A similar transfer scheme can be achieved for transferring image to and accumulating image data at the IAD 224. In particular, four bytes of image data can be transferred from the page buffer 168 to the burst buffer 216 of the IAD 222 in a burst mode for accumulation therein. In the meantime, the accumulated image data can be transferred to the IOT interface 46, by way of decompressor 218, at a rate that is substantially less than the burst mode transfer rate.

Referring again to FIG. 9, it will be appreciated that components other than the IAC 148 and the IAD 222 can communicate with the page buffer 168 at time intervals in which image data is not being transferred to and from the page buffer 168 in the burst mode. As shown in FIG. 9 there are at least three intervals in which the page buffer 168 respectively communicates with the CPU 160, the RF 196 and the DDC 208 while image data is being accumulated at the burst buffer 146 and/or image data is being transmitted to the IOT interface 46. In one example, image data can be transmitted to the CPU 160 for manipulation thereof, and in another example image data can be stored sequentially in the disk drive 206 for subsequent printing. It will be recognized that use of the disk drive 206 to store image data is preferred when printing of sets of multiple copies is desired.

With reference to to the following example, it will be understood how the above-described design of the VP 16 optimizes utilization of the image bus 154, and thus maximizes multi-functionality of the printing apparatus 10. Since the compressor 138 can write image data to the burst buffer 146 at a rate of one (1) 16-bit byte per 700 ns, the burst buffer 146 can accumulate four (4) 16-bit bytes in 2800 ns. Using DMA type transfer, the four bytes can be transferred to the page buffer 168 in 600 ns. Accordingly, during the accumulation period, 2200 ns remain for another I/O device to access the image data bus 154.

The exemplary I/O devices discussed above, other than the IAC 148 and the IAD 222, have the following data transfer rates:

| CPU 160 | 400 ns/16-bit byte (at 10 MHz clock) |

-continued

| RF 196 | 400 ns/16-bit byte |
| DDC 208 | 300 ns/Refresh Cycle |

In view of the above-stated rates, it follows that either the IAC 148 or the IAD 22 as well as the CPU 160, the RF 196 and the DDC 208 can access the bus 154 at least once during the 2800 ns interval in which four bytes are being accumulated in the burst buffer 146.

For the above example, image bus utilization of the image data bus 154 can be calculated relative to the I/O device using the bus 154 with the least frequency. Of the above-mentioned I/O devices, the RF 196, having a refresh cycle of 300 ns every 15000 ns, requires the bus 154 with the least frequency, i.e. only 2% of the 15000 ns interval. The DDC 208 requests the bus once every 5000 ns (8% of the 15000 ns interval), and, for a worst case compression ratio of 1:1, either the IAC 148 or the IAD 222 requires a data transfer once every 2800 ns for 600 ns (8% of the 15000 ns interval). Accordingly, the CPU 160 can use the bus as much as 68.57% of the 15000 ns interval. For higher compression rates, which in the preferred embodiment can be as high as 30:1, even more bus access time is made available for either the CPU 160, the RF 196 and the DDC 208. It will be appreciated by those skilled in the art that the relatively high utilization scheme described above permits for advantageous operation of the printing apparatus 10 in that multiple functions, such as data transfer, data manipulation and data storage, can all be performed in a time interval that, at least to the user, seems extremely brief.

Figure 11:
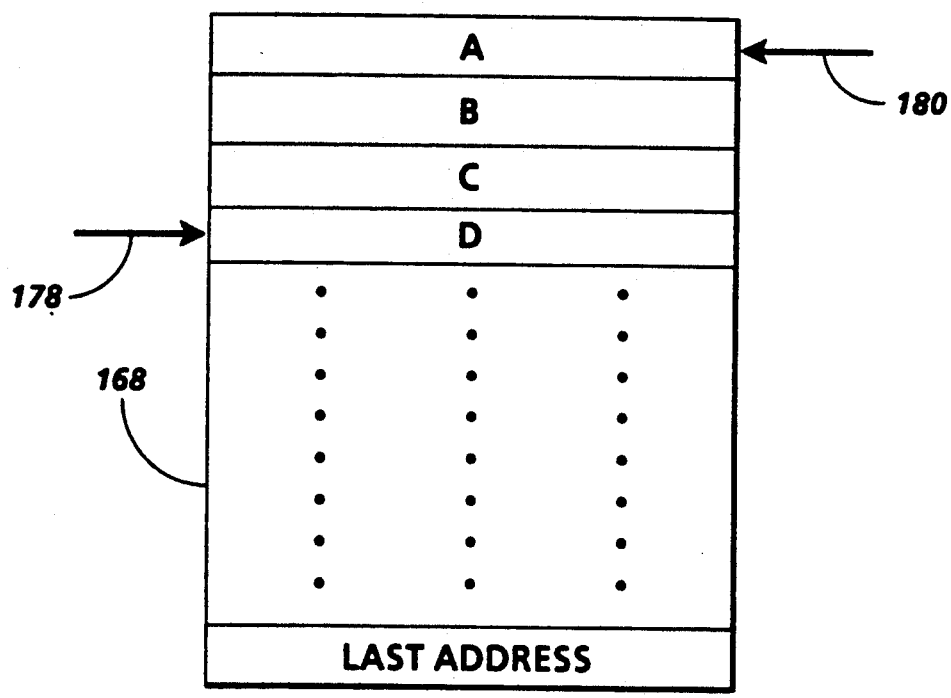
FIG. 11 is a schematic representation demonstrating how two address counters can be used as a dual pointing arrangement for the page buffer.
Figure 12:
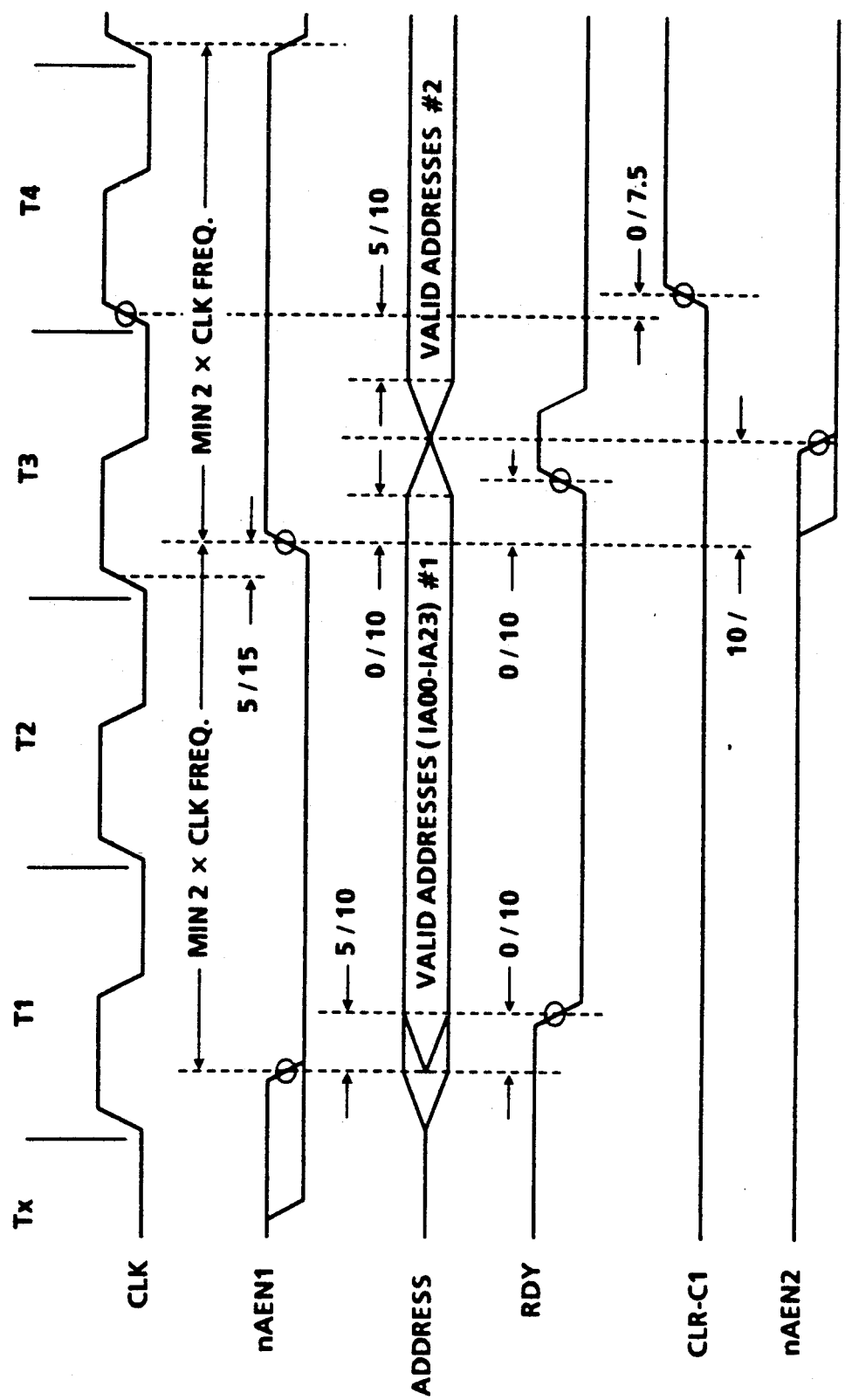
FIG. 12 is a timing diagram demonstrating the use of the dual pointing arrangement of FIG. 11.

Referring to FIGS. 5 and 11-12, features of the MAR 156, that are believed to significantly enhance data transfer operations, are discussed in further detail. In particular, each of counters or pointers 178, 180 (FIG. 5) function as "loop-around pointers" whose movements are respectively limited by the pre-programmed comparators 180, 182. Accordingly, respective movement of each of the counters or pointers 178, 180 down the stack of the page buffer 168 is limited by the respective settings of the comparators 182, 184. Such limiting of the pointers 178, 180 is particularly suitable for those instances in which the user does not intend to overwrite certain data stored further down in the stack.

Another aspect of the dual pointer arrangement is that image data need not be written into and read out of the page buffer 168 with the same counter. In the illustrated example of FIG. 11, four bytes of image data have been written into the page buffer 168 from the IAC 148 so that the pointer 178 has been moved from the first address "A" to the fourth address "D." If only pointer 178 were available, the image data would be read out of the page buffer 168 by looping the pointer 178 back to address A. With the concept disclosed by the present invention, however, the data at the addresses A-D can be read out using the second pointer 180. As will be appreciated by those skilled in the art, each of pointers 178, 180 can be used to designate an address for use in any suitable page buffer operation.

Referring to FIG. 12, a "snapshot" of the pointing arrangement in FIG. 11 is shown. During a first interval the address D can be designated for a data transfer operation with a first I/O device by causing the enabling signal nAEN1 to go low. Subsequently, the address at A can be designated for a data transfer operation with a second I/O device by causing the enabling signal nAEN2 to go low. In one example, the first I/O device could be the IAC 148 with image data being written into the page buffer 168, and the second I/O device could be the IAD 224 with data being read out to the IOT interface 46. In other contemplated examples the I/O devices could be various combinations of the IAC 148, the CPU 160, the RF 196, the DDC 208, the IAD 222 or any like I/O device that could be coupled with the page buffer 168.

An expandable electronic subsystem (ESS), incorporating many of the above discussed concepts, is designated by the numeral 300. In the illustrated embodiment of FIG. 13, the expandable ESS 300 comprises a CPU processing module 302, a DMA processing module 304 as well as an IIT/IOT module 306, a FAX 307, a video processor (VP) 308, a page description language (PDL) decomposing module 309, an image manipulation board (IMB) 310 and user interface (UI) 311. The processors 302 and 304, are coupled with some or all of the input/output modules 306–311 by way of three buses, the three buses being respectively referred to as CBUS 320, DBUS 322 and VBUS 324. Preferably, each of the buses, 320, 322 and 324 is a multi-purpose bus that is capable of transferring addresses, control data and image data thereacross substantially concurrently.

Figure 13:
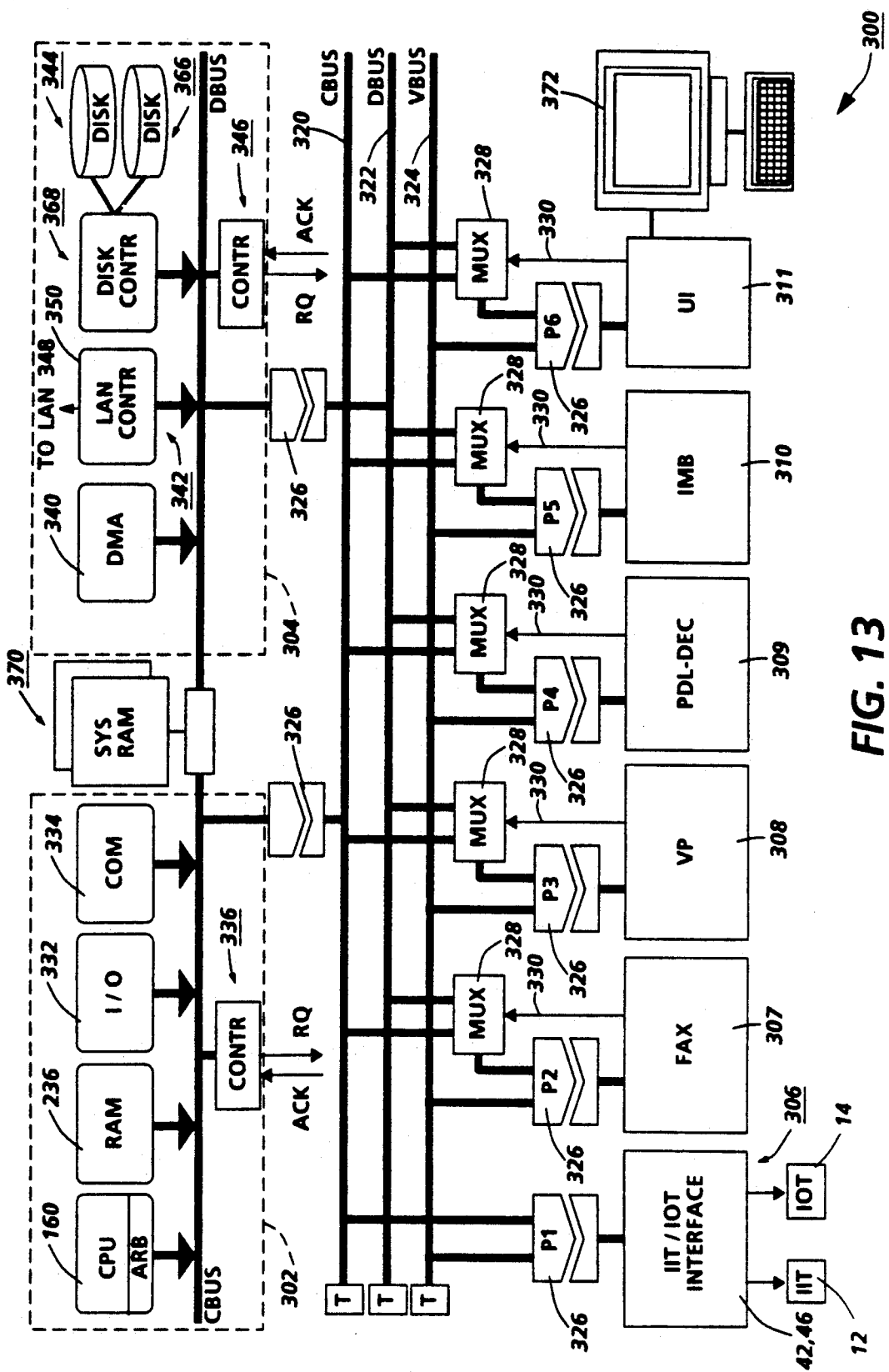
FIG. 13 is a schematic, block diagramatic representation of an expandable electronic subsystem (ESS)

The CPU processor 302 and the DMA processor 304 are respectively coupled with the CBUS 320 and the DBUS 322. Preferably, the IIT/IOT module 306 is coupled with both the CBUS 320 and the VBUS 324. Additionally, each of the processors 302, 304 and the modules 306–311 is coupled with one of the buses 320, 322 and 324 by way of a conventional connector 326. As shown in FIG. 13, each of the input/output modules 307–311 communicates selectively with the buses 320 and 322 by way of an arrangement including one of the connectors 326 and a multiplexor 328, which multiplexor 328 is controlled across a line 330.

The CPU processing module 302 comprises the CPU 160 and the RAM 236 as well as an I/O control block 332, a communications port 334 and a control device 336. Essentially, the I/O control block 332 serves as an interface which allows the CPU 160 to interact with the various input/output modules 306–311 of the expandable ESS 300. For example, the I/O control block 332 allows the CPU 160 to determine the timing of the FAX 308 so that addresses and/or data can be transferred appropriately between the CPU processing module 302 and the FAX 308.

The communications port 334, which may, in one example, comprises a Centronics Port and/or a RS 232 allows the CPU processing module 302 to communicate with peripherals, such as another terminal or printer. Data can be transferred between the CPU 160 and modules 306–311 by way of the control device 336, the control device 336 serving as a decoder for the CPU processing module 302. For example, to transmit a byte of data to one of the modules 306–311, the CPU 160 places the byte of data on the CBUS 320 with a suitable address, and once the address is decoded by the control device 336, the data can be transferred to the module corresponding to the address. The control device 336, and thus the CPU 160, communicates with the various components of the expandable ESS 300 by way of request and acknowledge lines respectively designated as "RQ" and "ACK." To receive a byte of data from one of the modules 306–311, the transmitting module places a request on the CBUS 320 so that the CPU 160, by use of, for example, an internal arbiter, can acknowledge the transfer of the byte of data to the RAM 236.

The DMA processing module 304 comprises a DMA module 340, a LAN module 342, a Disk Drive module 344 and a control device 346. In one example, the DMA module 340 comprises a known DMA device, such as one of the DMAs manufactured by Simpson or Motorola Corporations, coupled to the DBUS 322 by way of a DMA controller, the DMA controller being adapted for use with the various components of the expandable ESS 300. The general concepts underlying the structure and operation of the DMA module 340 can be more fully appreciated by reference to FIGS. 3A, 3B and the accompanying discussion of the DMA 142.

Figure 14:
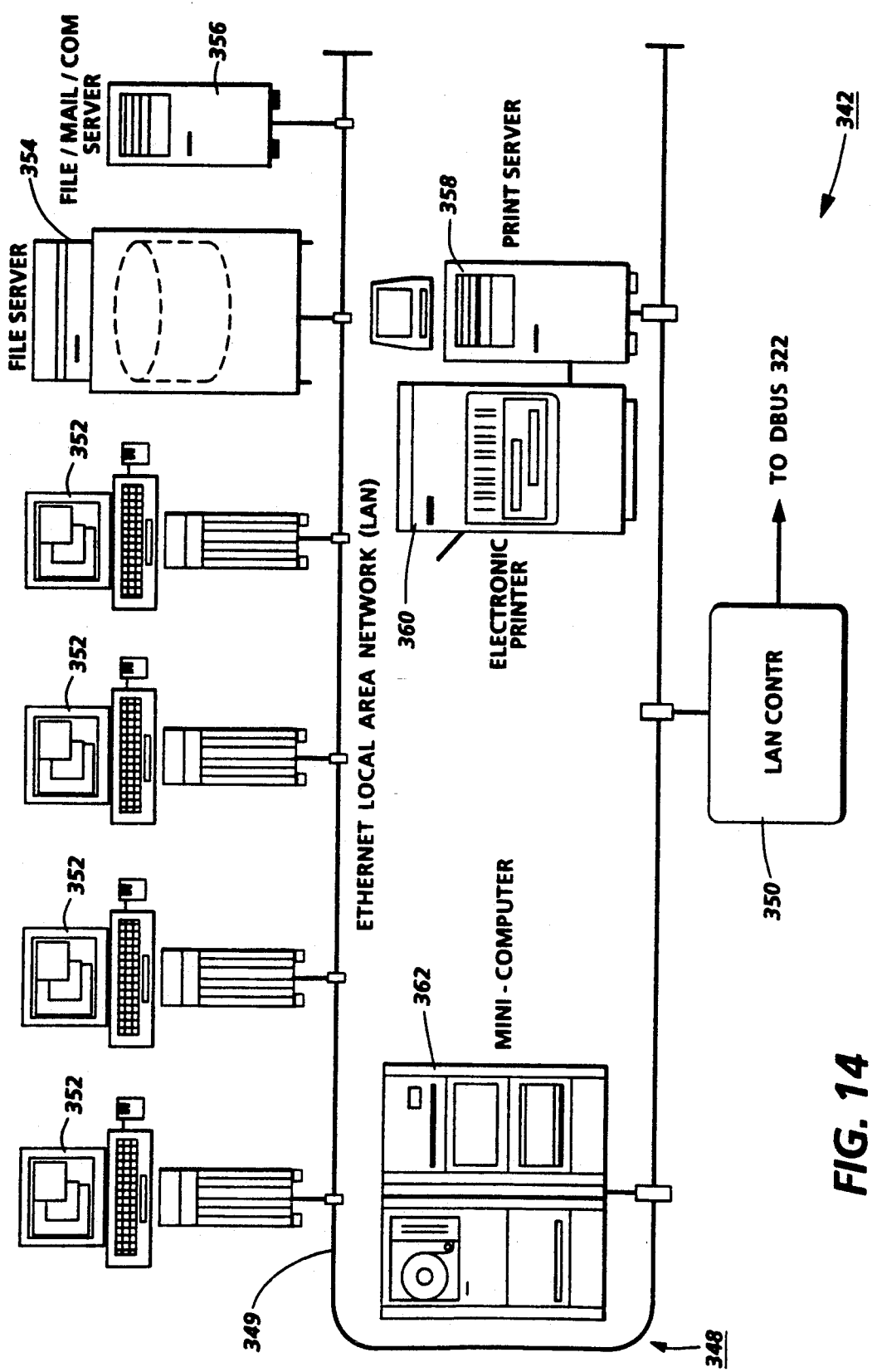
FIG. 14 is a schematic, block diagramatic representation of a local area network (LAN) system coupled with the expandable ESS.

Referring to FIG. 14, the LAN module 342 is shown in further detail. Preferably, the LAN module 342 comprises a LAN system 348 and a controller 350 for interfacing the LAN system 348 with the DBUS 322. In the illustrated embodiment of FIG. 14, the LAN system 348 includes an Ethernet LAN 349 to which a number of work stations 352 are connected. Workstation 352, may be, for example, the Xerox 6085 professional work stations.

LAN 349 may also have other office connected equipment, such as a network file server 354, a network file mail communication server 356, a print server 358 and an electronic printer 360. Also, a large capacity remote storage facility, such as a mini-computer 362 may be connected to the LAN 349. The LAN system 348 is a collaborative system, meaning that it enables users at different workstations 352 to work together in real-time by processing and passing information among one another and storing and retrieving information from storage services 354 and 362 via the network 349.

The Disk Drive module 344 (FIG. 13) comprises one or more disk memory devices 366, which devices 368 are coupled with the DBUS 322 by way of a disk drive controller 368, such as a SCSI controller. The general concepts underlying the structure and operation of the Disk Drive module 344 can be more fully appreciated by reference to FIGS. 3A, 3B and the accompanying discussion of the Disk Drive module 204.

The control device 346 functions in the same manner as the control device 336. That is the control device 346 decodes addresses for data transferred across the DBUS 322. Additionally, the control device 346 communicates with the various components of the expandable ESS 300 by way of request and acknowledge lines respectively designated as "RQ" and "ACK."

The CPU processing module 302 and the DMA processing module 304 share a system RAM 370. In the preferred embodiment, the system RAM 370 serves as a global storage area for software and files used with the various components of the expandable ESS 300. For example, the system RAM 370 is particularly well suited to store wide variety software, such as image conversion and image editing software, for use with the CPU 160.

The IIT/IOT module 306 is constructed with the above-discussed components. In particular, as shown in FIGS. 3A and 3B, the IIT 12 and the IOT 14 are respectively coupled with IIT interface 42 and IOT interface 46.

The FAX 307 is a conventional group III type facsimile device, which may be similar in construction to the illustrated FAX of U.S. Pat. No. 5,021,892, the pertinent portions of which patent are incorporated herein by reference. As with the FAX of the '892 patent the FAX 307 may include a transmission control portion (not shown), the control portion containing a slave CPU (not shown) for controlling a data transmission procedure based on a CCITT standard. The control portion is adapted to exchange data with any of the buses 320, 322 and 324 according to the transmission procedure. The control portion can also be connected to a telephone line by way of a modem (not shown) and a network control unit (not shown) as shown in the '892 patent.

The video processor (VP) module 308 incorporates many of the basic components of the VP 10, the VP 10 being discussed in further detail above. More specifically, the VP module 308 can be implemented with various components of networks 116, 118, 120 and 124 to achieve such functions as data compression, relatively high speed data transfer, image bus arbitration, image data storage and data decompression.

The page description language (PDL) decomposing-processing module 309 comprises all of the necessary hardware, such as a dedicated processor and suitable registers, to decompose a master PDL file into a bitmap file for printing. As can be appreciated by those skilled in the art, PDLs are an interchange standard for representing documents electronically within a system and ultimately printing those documents. In one example, documents formatted as a PDL file can be exchanged between the work stations 352 of the LAN system 348, the PDL processing module 309 and the IOT 14 in an efficient and consistent manner. The PDL file describes, among other things, how images are to be rendered on each page, what font is to be employed and how the pages are to be assembled. The PDL processing module 309 can receive, as input for printing, electronic documents in various forms, such as POSTSCRIPT, HP-PCL or INTERPRESS.

The image manipulation board (IMB) 310 comprises suitable hardware for achieving such functions as image editing and image conversion. In one example, the hardware may comprise a dedicated processor and a suitably sized bitmap, the bitmap being adapted for use with a large variety of software. The IMB 310 is particularly suited for, among other procedures, wide and small angle rotations, image annotation, or any other known image manipulation processes.

User Interface (UI) module 311 can possess the same structure as that discussed above for user interface 130 (FIGS. 3A, 3B). In the illustrated embodiment of FIG. 13, the user interface module 311 is adapted for use with a conventional terminal 372. Additionally, as above, the user interface 130 is coupled with the buses 320, 322 and 324 by way of suitable interface logic, such as user interface logic 132.

Due to the arrangement of the various modules with the buses 320, 322 and 324, the expandable ESS 300 operates as a multi-tasking arrangement capable of performing simultaneous or concurrent operations. For example, since the modules 306-311 communicate with the VBUS 324, addresses, image data and control data can be communicated between any of the two modules 306-311. Additionally, since each of the modules 306-311 is coupled with the CBUS 320 addresses, control data and image data can be transferred between the CPU processing unit 302 and any one of the modules 306-311 that is not using the VBUS 324. That is, transfers across the VBUS 324 between two of modules 306-311 can be performed concurrently with transfers between the CPU processing module 302 and the one of the modules 306-311 which is not using the VBUS 324.

Finally, since the modules 307-311 are coupled with the DBUS 322, data can be transferred between the LAN module 342 or the disk drive 344 and any one of the modules 307-311 which is not using the buses 320 and 324. As will be recognized, large blocks of data can be transferred from or to either the LAN module 342 or the disk drive 344 relatively quickly by use of the DMA module 340. Moreover, such data transfer can be performed concurrently with data transfers on the CBUS 320 and the VBUS 324.

In one example of operation, image data is transferred between the IMB 310 and the IIT/IOT interface 306 concurrently with transfers between both the CPU processing module 302 and the FAX 307 and between the disk drive module 344 and the PDL processing module 309. As will be appreciated by those skilled in the art, however, a wide variety of concurrent transfers can be achieved using various combinations of the CPU processing module 302, the DMA processing module 304 and the input/output modules 306-311. In the preferred embodiment the use of three buses 320, 322 and 324, in conjunction with the processors 302, 304 and the input/output modules 306-311, allows for up to three simultaneous transfers. In other contemplated embodiments, additional buses as well as additional processors and additional input/output modules could be employed to achieve a higher degree of flexibility with more than three concurrent transfers.

What is claimed is:

1. A printing machine of the type in which image data, addresses and control data can be substantially concurrently transferred across multiple multipurpose buses, comprising:
    a first multipurpose bus adapted to transfer a first set of data, said first set of data including image data, addresses and control data;
    a second multipurpose bus decoupled with respect to said first multipurpose bus and adapted to transfer a second set of data, said second set of data including image data, addresses and control data;
    a first processing module, communicating with said first multipurpose bus, for processing the first set of data;
    a first discrete input/output module operatively coupled with said first multipurpose bus, both said first processing module and said first discrete input/output module transferring the first set of data between one another for processing thereof;
    a second discrete input/output module operatively coupled with both said first multipurpose bus and said second multipurpose bus; and
    a third discrete input/output module operatively coupled with both said first multipurpose bus and said second multipurpose bus, said second and third discrete input/output modules transferring the second set of data between one another, across said second multipurpose bus, while the first set of data is being transferred across said first multipurpose bus.

2. The printing machine of claim 1, wherein a selected one of said first, second and third discrete input/output modules comprises means for scanning an original document, said scanning means including means for generating image data from an image, said scanning means being controlled by said processing module.

3. The printing machine of claim 2, further comprising a printing device, said printing device being controlled by said first processing module.

4. The printing machine of claim 3, further comprising:
a charge retentive member;
means, disposed adjacent said charge retentive member, for charging said charge retentive member, said printing device being adapted to selectively discharge a surface of said charge retentive member to form an intelligible pattern of charged and discharged areas on said charge retentive member;
means, disposed adjacent said charge retentive member, for developing the intelligible pattern on said charge retentive member to form a developed pattern thereon; and
means, disposed adjacent said charge retentive member, for transferring the developed pattern from said charge retentive member to a substrate.

5. The printing machine of claim 1, wherein a selected one of said first, second and third discrete input/output modules comprises a video processor; and
said video processor including a memory section for selectively storing a selected one of the first and second sets of data.

6. The printing machine of claim 5, further comprising means for compressing and decompressing a selected one of the first and second sets of data wherein said video processor compresses, selectively stores and decompresses the selected one of the first and second sets of data.

7. The printing machine of claim 1, wherein a selected one of said first, second and third discrete input/output modules comprises a facsimile apparatus for transferring a selected one of the first and second sets of data between said facsimile apparatus and a remote source.

8. The printing machine of claim 1, wherein a selected one of said first, second and third discrete input/output modules comprises a page description language decomposing module, said page description language decomposing module including means for decomposing a selected one of the first and second sets of data from a page description language.

9. The printing machine of claim 1, in a selected one of said first and second sets of data includes an image, wherein a selected one of said first, second and third discrete input/output modules comprises means for manipulating the image of said selected one of said first and second sets of data.

10. The printing machine of claim 1, wherein a selected one of said first, second and third discrete input/output modules comprises means for displaying a selected one of the first and second sets of data.

11. The printing machine of claim 1, wherein said first processing module comprises a microprocessor.

12. The printing machine of claim 1, further comprising:
a third multipurpose bus decoupled with respect to said first and second multipurpose buses, and adapted to transfer a third set of data, said third set of data including the image data, addresses and control data;
a second processing module, operatively coupled with said third multipurpose bus, for processing the third set of data; and
a fourth discrete input/output module operatively coupled with said third multipurpose bus, said second processing module and said fourth discrete input/output module transferring the third set of data between one another while both the first set of data is being transferred between said first processing module and said first input/output module and the second set of data is being transferred between said second discrete input/output module and said third discrete input/output module.

13. The printing machine of claim 12, further comprising a multiplexor, said multiplexor selectively coupling said fourth discrete input/output module with both said first and third multipurpose buses.

14. The printing machine of claim 12, wherein said fourth discrete input/output module is operatively coupled with said first multipurpose bus so that said fourth discrete input/output module communicates with a selected one of said first discrete input/output module and said first processing module.

15. The printing machine of claim 12, wherein said fourth discrete input/output module is operatively coupled with said second multipurpose bus so that said fourth discrete input/output module communicates with a selected one of said second and third discrete input/output modules.

16. The printing machine of claim 15, wherein said first discrete input/output module communicates with said second multipurpose bus so that a selected one of said first, second and third sets of data is transferred across said second multipurpose bus between two of said first, second, third and fourth discrete input/output modules.

17. The printing machine of claim 12, wherein:
said second processing module comprises a direct memory access device and a memory section; and
said direct memory access device is enables data transfer between said memory section and said fourth discrete input/output.

18. The printing machine of claim 17, wherein said memory section comprises a disk drive device.

19. The printing machine of claim 18, wherein:
said second processing module comprises a direct memory access device and a local area network module; and
said direct memory access device is enables data transfer between said local area network module and said fourth discrete input/output module.

* * * * *